(12) United States Patent
Nakamura et al.

(10) Patent No.: US 7,955,731 B2
(45) Date of Patent: Jun. 7, 2011

(54) NONAQUEOUS ELECTROLYTE SECONDARY CELL

(75) Inventors: Tomoyuki Nakamura, Fukushima (JP); Yuji Uchida, Fukushima (JP); Takehiko Suwa, Fukushima (JP); Hirotaka Sakai, Fukushima (JP); Takahiro Endo, Fukushima (JP)

(73) Assignee: Sony Corporation, Tokyo (JP)

( * ) Notice: Subject to any disclaimer, the term of this patent is extended or adjusted under 35 U.S.C. 154(b) by 731 days.

(21) Appl. No.: 11/836,038

(22) Filed: Aug. 8, 2007

(65) Prior Publication Data

US 2008/0138702 A1    Jun. 12, 2008

(30) Foreign Application Priority Data

Aug. 14, 2006  (JP) ................. 2006-221249
Aug. 14, 2006  (JP) ................. 2006-221311
Jan. 30, 2007  (JP) ................. 2007-019525
Jan. 30, 2007  (JP) ................. 2007-019534

(51) Int. Cl.
*H01M 6/04* (2006.01)

(52) U.S. Cl. ........ 429/188; 429/163; 429/338; 429/246; 429/247

(58) Field of Classification Search .................. 429/132, 429/130, 188, 338, 246, 247
See application file for complete search history.

(56) References Cited

FOREIGN PATENT DOCUMENTS

| JP | 1294373 | 11/1989 |
|---|---|---|
| JP | 2148576 | 6/1990 |
| JP | 04-206364 | 7/1992 |
| JP | 04-332482 | 11/1992 |
| JP | 2646657 | 5/1997 |
| JP | 2757398 | 3/1998 |
| JP | 2000-057847 | 2/2000 |
| JP | 2000-149997 | 5/2000 |
| JP | 2000-251944 | 9/2000 |
| JP | 2000-285959 | 10/2000 |
| JP | 2000-285965 | 10/2000 |
| JP | 2000285959 | 10/2000 |
| JP | 2001-118559 | 4/2001 |
| JP | 2001-229980 | 8/2001 |
| JP | 2002-367679 | 12/2002 |
| JP | 3501365 | 3/2004 |
| JP | 2005-050808 | 2/2005 |
| JP | 2005-276598 | 10/2005 |
| JP | 2005-285372 | 10/2005 |
| JP | 2005-353582 | 12/2005 |
| JP | 2006-059800 | 3/2006 |
| JP | 2006-127849 | 5/2006 |
| JP | 2006-156331 | 6/2006 |

*Primary Examiner* — Patrick Ryan
*Assistant Examiner* — Ben Lewis
(74) *Attorney, Agent, or Firm* — K&L Gates LLP

(57) ABSTRACT

A nonaqueous electrolyte secondary cell includes an electrode body including a positive electrode, a negative electrode, and a separator, the positive electrode and the negative electrode being arranged to oppose each other with the separator therebetween, and being rolled or stacked; a nonaqueous electrolyte solution; and an exterior package for accommodating the electrode body and the nonaqueous electrolyte solution. A polymeric support is provided between the separator and at least one of the positive electrode and the negative electrode, and the ratio (MO/MA) of the amount (MO) of the nonaqueous electrolyte solution present between the electrode body and the exterior package to the amount (MA) of the nonaqueous electrolyte solution present in the exterior package is 0.04 or less.

16 Claims, 6 Drawing Sheets

NONAQUEOUS ELECTROLYTE SECONDARY CELL

CROSS REFERENCES TO RELATED APPLICATIONS

The present application claims priority to Japanese Patent Application JP 2006-221249 filed in the Japanese Patent Office on Aug. 14, 2006, JP 2006-221311 filed in the Japanese Patent Office on Aug. 14, 2006, JP 2007-019534 filed in the Japanese Patent Office on Jan. 30, 2007, and JP 2007-019525 filed in the Japanese Patent Office on Jan. 30, 2007, the entire contents of which are incorporated herein by reference.

BACKGROUND

The present application relates to nonaqueous electrolyte secondary cells and in particular to a nonaqueous electrolyte secondary cell having excellent cycle characteristics and capable of suppressing or preventing swelling during high-temperature storage. It also relates to a nonaqueous electrolyte secondary cell having leaktightness and excellent cycle characteristics.

Recent years have seen emergence of a variety of portable electronic apparatuses such as camcorders (videotape recorders with cameras), cellular phones, and portable computers, and size and weight reduction of these apparatuses have been achieved. To keep pace with such trends, development of cells as portable power supplies for these electronic apparatuses, in particular, secondary cells, is actively conducted. Of such batteries, lithium ion secondary cells have attracted much attention as a device that can achieve high energy density.

Further size and weight reduction of cells by using laminate films and the like as the exterior package of the cells to replace metal cans of aluminum, iron, or the like, is also underway.

For the secondary cells using metal cans as the exterior package, a suggestion has been made for improving the cycle characteristics or the like by controlling the amount of electrolyte solution and amount of voids per unit cell volume (refer to Japanese Patent Nos. 2646657 and 2757398 and Japanese Unexamined Patent Application Publication No. 2000-285959). These patent documents relate to a liquid-system cell using an electrolyte solution as the electrolyte and specify the amount of electrolyte solution to the voids to prevent leakage of the solution and prevent the inner pressure from increasing.

However, when the amount of electrolytic solution prescribed in these patent documents is applied to a secondary cell that uses a laminate film as the exterior package, the cell swells extensively during storage at high temperature, which is problem.

Swelling during storage at high temperature can be suppressed by reducing the amount of electrolytic solution in the cell. If the amount of the electrolytic solution is excessively reduced and the electrolytic solution does not completely fill the space around the active material, cell reaction rarely occur in portions inside the electrode not in contact with the electrolytic solution, and sufficient cell volume would not be achieved.

Moreover, as the charge and discharge operation is repeated and the electrolytic solution between the negative and positive electrodes is consumed, the discharge capacity of the cell gradually decreases before the negative and positive electrode active materials deteriorate. Moreover, there may occur problems of degradation in cycle characteristics and internal shorts attributable to deficiency of the electrolytic solution.

In order to increase the energy density, it is desirable to charge as much as active materials involving charge and discharge reaction as possible. This requires the electrolytic solution in an amount sufficient to allow lithium ions to travel between the positive and negative electrodes. If the amount of electrolytic solution is not sufficient and the electrolytic solution does not completely surround the active material, the part not in contact with the electrolytic solution does not react, and a sufficient cell volume is rarely obtained.

Moreover, as the charge and discharge operation is repeated and the electrolytic solution between the negative and positive electrodes is consumed, the discharge capacity of the cell gradually decreases before the negative and positive electrode active materials deteriorate. Moreover, there may occur problems of degradation in cycle characteristics and internal shorts attributable to deficiency of the electrolytic solution.

In order to overcome such a problem, for a cell using a metal cell can, there has been a suggestion for improving the cycle characteristics by controlling the volume of the nonaqueous electrolytic solution relative to the discharge capacity (e.g., refer to Japanese Unexamined Patent Application Publication No. 2-148576).

However, this problem is not sufficiently overcome for nonaqueous electrolyte secondary cells using laminate films described above.

That is, when a laminate film is damaged, the laminate film undergoes rupture more easily than a hard metal can, and leakage of solution may occur from the ruptured part. Thus, increasing the amount of electrolytic solution in aiming to enhance the cycle characteristics has led to a problem of easy leakage.

SUMMARY

The present inventors have found that, in a nonaqueous electrolyte secondary cell in which a nonaqueous electrolyte solution is retained in the polymeric support, the ratio of the amount of the electrolyte solution not retained in the support and present between the electrode body and the exterior package to the amount of the electrolyte solution in the exterior package largely affects the cell characteristics and swelling.

It is desirable to provide a nonaqueous electrolyte secondary cell that has excellent cycle characteristics and capacity to suppress or prevent swelling during storage at high temperature.

It is also desirable to provide a nonaqueous electrolyte secondary cell having excellent leaktightness and cycle characteristics.

The present inventors have conducted investigations and have found that a nonaqueous electrolyte secondary cell that has excellent cycle characteristics and capacity to suppress or prevent swelling during storage at high temperature can be provided by disposing a particular polymeric support at a particular position and by controlling the ratio of the amount of the nonaqueous electrolyte solution between the electrode body and the exterior package to the amount of the nonaqueous electrolyte solution inside the exterior package to a predetermined value or less.

According to a first embodiment, a nonaqueous electrolyte secondary cell includes an electrode body including a positive electrode, a negative electrode, and a separator, the positive electrode and the negative electrode being arranged to oppose each other with the separator therebetween, and being rolled or stacked; a nonaqueous electrolyte solution; and an exterior package for accommodating the electrode body and the nonaqueous electrolyte solution. A polymeric support is provided between the separator and at least one of the positive electrode and the negative electrode, and the ratio (MO/MA) of the amount (MO) of the nonaqueous electrolyte solution present between the electrode body and the exterior package to the amount (MA) of the nonaqueous electrolyte solution present in the exterior package is 0.04 or less.

Preferably, the polymeric support is adhered or bonded to the separator and at least to one of the positive electrode and the negative electrode.

More preferably, the nonaqueous electrolyte solution contains a halogen-containing cyclic carbonic ester derivative to further improve the cycle characteristics.

The present inventors have also found on the basis of extensive investigations that a nonaqueous electrolyte secondary cell having excellent leaktightness and cycle characteristics can be provided by applying a nonaqueous solvent having a particular composition to the nonaqueous electrolyte solution.

According to a second embodiment, a nonaqueous electrolyte secondary cell includes positive electrode; a negative electrode; a nonaqueous electrolyte solution; a separator disposed between the positive electrode and the negative electrode; and an exterior package comprised of a laminate film, for packaging the positive electrode, the negative electrode, the nonaqueous electrolyte solution, and the separator. A polymeric support is disposed between the separator and at least one of the positive electrode and the negative electrode, the polymeric support adhering to the separator and at least one of the positive electrode and the negative electrode. The nonaqueous electrolyte solution contains a nonaqueous solvent containing 20 percent by mass or more and 50 percent by mass or less of a cyclic carbonate and 50 percent by mass or more and 80 percent by mass or less of a low-viscosity nonaqueous solvent. The amount of the nonaqueous electrolyte solution present in the nonaqueous electrolyte secondary cell is 0.14 g or more and 0.35 g or less per cubic centimeter of the volume of the nonaqueous electrolyte secondary cell.

Additional features and advantages are described herein, and will be apparent from, the following Detailed Description and the figures.

DETAILED DESCRIPTION

Figure 1:
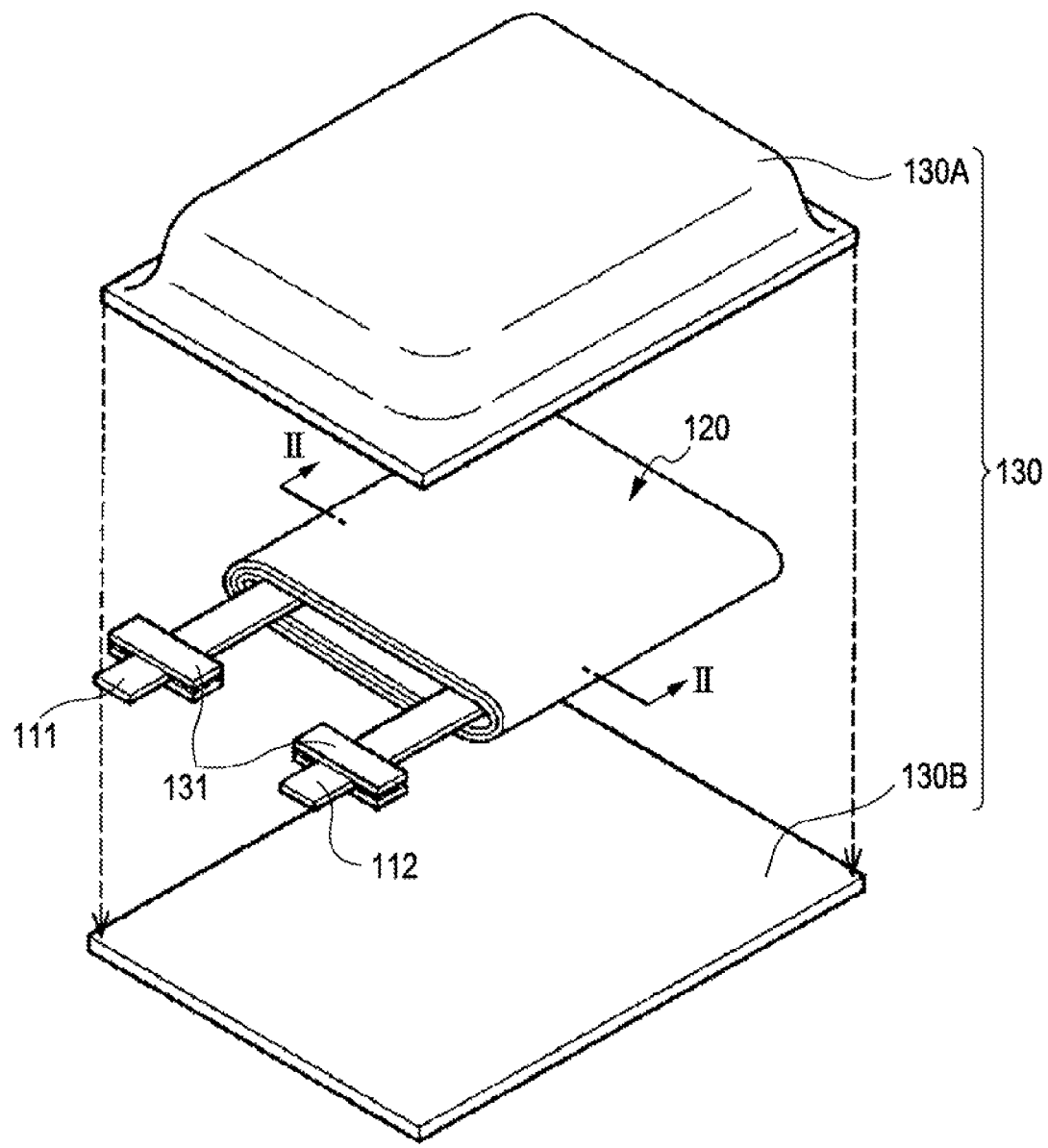
FIG. 1 is an exploded perspective view showing an example of a laminate-type secondary cell according to a first embodiment of the nonaqueous electrolyte secondary cell.

A nonaqueous electrolyte secondary cell according to a first embodiment will now be described in detail. In the description, "%" indicating the content, concentration, and the like means percent by mass unless otherwise noted.

As described above, the nonaqueous electrolyte secondary cell of the first embodiment includes an electrode body produced by laminating or rolling a positive electrode, a negative electrode, and a separator interposed between the positive and negative electrodes; a nonaqueous electrolyte solution; and an exterior package accommodating the electrode body and the nonaqueous electrolyte solution, the exterior package including packaging members. The cell further includes a polymeric support between the separator and at least one of the positive and negative electrodes, and the ratio of the amount MO of the nonaqueous electrolyte solution between the electrode body and the exterior package to the amount MA of the nonaqueous electrolyte solution inside the exterior package, i.e., the ratio MO/MA, is 0.04 or less.

The amount MA of the nonaqueous electrolyte solution inside the exterior package, i.e., inside the nonaqueous electrolyte secondary cell, may be measured and calculated by the following method.

First, the mass of the cell is measured, and then the electrode body is taken out. The electrode body is disassembled into the positive electrode, the negative electrode, and the separator, and the positive electrode, negative electrode, the separator, and the exterior package are immersed in a washing liquid such as dimethyl carbonate for 2 days, followed by filtering and vacuum drying for 3 days. The mass of the cell after the vacuum drying is measured and subtracted from the initial mass of the cell to determine MA.

The amount MO of the nonaqueous electrolyte solution between the electrode body and the exterior package, i.e., inside the nonaqueous electrolyte secondary cell but outside the electrode body, may be measured and calculated by the following method.

First, the mass of the cell is measured, and the electrode body is taken out. The electrode body taken out is interposed between materials, such as cloths, absorbing the nonaqueous electrolyte and is put under a load of 10 kPa, and the nonaqueous electrolyte squeezed out is completely wiped out. The exterior package from which the electrode body is taken out is immersed in a washing liquid such as dimethyl carbonate followed by drying. The total mass of the external body and the electrode body after wiping out is calculated, and subtracted from the initial mass of the cell to determine MO.

If the ratio MO/MA exceeds 0.04, then it is difficult to suppress or prevent swelling during storage at high temperature.

The ratio MO/MA is preferably as small as possible and is most preferably 0. Notable swell-suppressing effect can be obtained at a ratio of 0.03 or less.

The nonaqueous electrolyte secondary cell of the first embodiment will now be described in further details with reference to the drawings.

FIG. 1 shows a nonaqueous electrolyte secondary cell according to the first embodiment and is an exploded perspective view showing an example of a laminate-type secondary cell.

As shown in FIG. 1, this cell includes a rolled cell element 120 equipped with a positive electrode terminal 111 and a negative electrode terminal 112, and an exterior package 130 including film-shaped packaging members 130A and 130B, the rolled cell element 120 being enclosed inside the exterior package 130.

The positive electrode terminal 111 and the negative electrode terminal 112 extend, for example, in the same direction from the interior of the exterior package 130 to the exterior. The positive electrode terminal 111 and the negative electrode terminal 112 are composed of a metal material, e.g., aluminum (Al), copper (Cu), nickel (Ni), and a stainless steel.

The constitutional elements of the rolled cell element 120 are the rolled electrode body and a nonaqueous electrolyte described in detail below.

The packaging members 130A and 130B are each made of a rectangular laminate film prepared by, for example, laminating a nylon film, an aluminum foil, and a polyethylene film in that order.

The packaging members 130A and 130B are arranged such that the rolled cell element 120 faces the polyethylene films of the packaging members 130A and 130B. The peripheral portions of the packaging members 130A and 130B are melt-bonded or bonded with an adhesive.

Adhesive films 131 for preventing entry of outside air are interposed between the packaging members 130A and 130B and the positive and negative electrode terminals 111 and 112. Each adhesive film 131 is composed of a material having adhesiveness to the positive electrode terminal 111 and the negative electrode terminal 112. For example, when the positive electrode terminal 111 and the negative electrode terminal 112 are composed of the above-described metal material, the adhesive film 131 is preferably composed of a polyolefin resin such as polyethylene, polypropylene, modified polyethylene or modified polypropylene.

Alternatively, the packaging members 130A and 130B may have a different structure from the laminate film described above, e.g., a laminate film not containing a metal material, a polymeric film, such as polypropylene, or a metal film.

A typical configuration of the packaging member is a laminate structure of external layer/metal foil/sealant layer (note that the external layer and the sealant layer may each be constituted from a plurality of layers). In the examples above, the nylon film corresponds to the external layer, the aluminum foil corresponds to the metal foil, and the polyethylene film corresponds to the sealant layer.

The metal foil desirably has a function of a moisture impermeable barrier layer. Not only an aluminum foil but also a stainless steel foil, a nickel foil, or a plated iron film can be used. An aluminum foil which is thin, lightweight, and superior in workability is preferred.

The structures of the packaging member employable include, in terms of (external layer/metal foil/sealant layer), nylon (Ny)/aluminum (Al)/cast polypropylene (CPP), polyethylene terephthalate (PET)/Al/CPP, PET/Al/PET/CPP, PET/Ny/Al/CPP, PET/Ny/Al/Ny/CPP, PET/Ny/Al/Ny/polyethylene (PE), Ny/PET/Al/linear low-density polyethylene (LLDPE), PET/PE/Al/PET/low-density polyethylene (LDPE), and PET/Ny/Al/LDPE/CPP.

Figure 2:
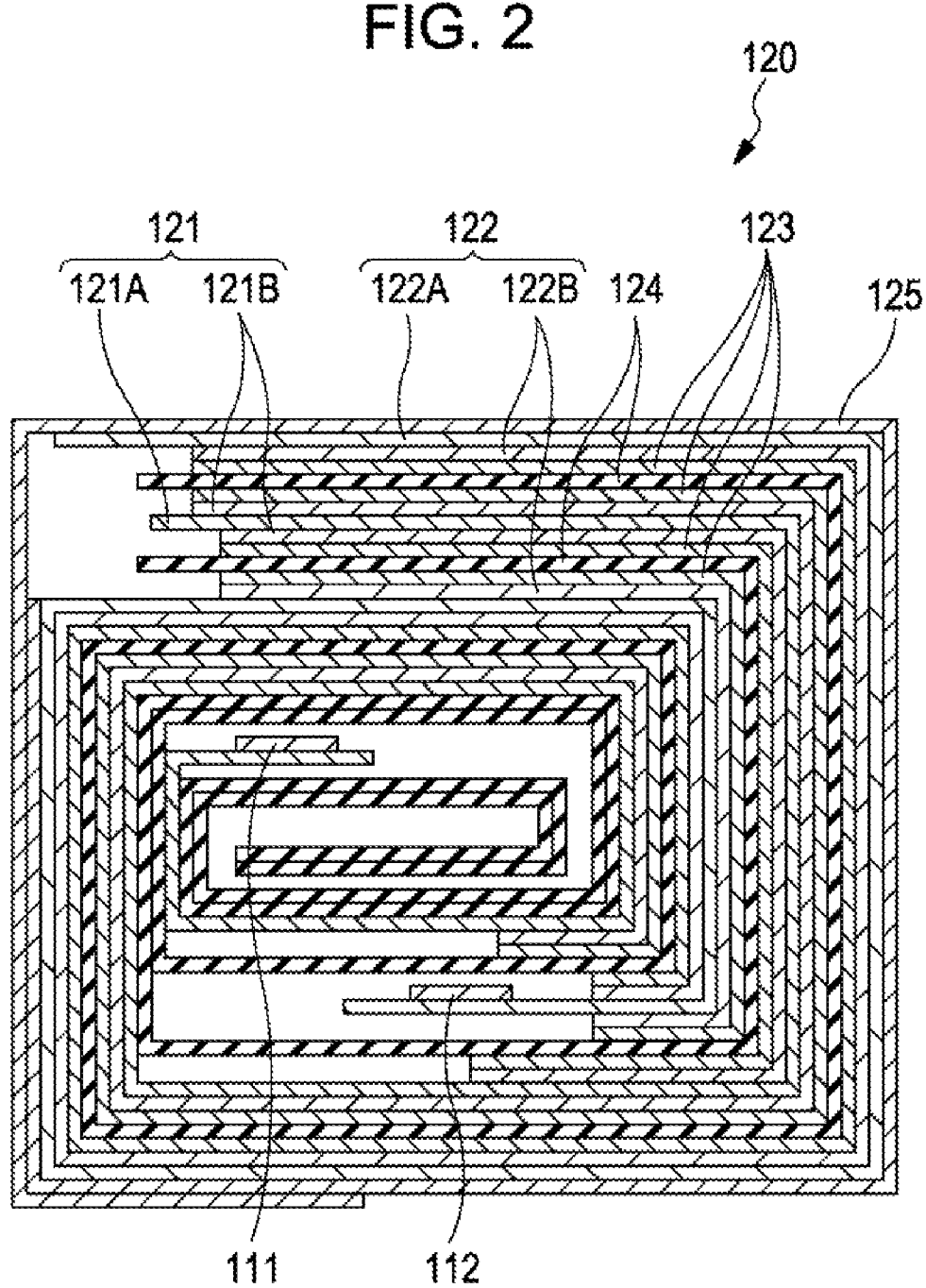
FIG. 2 is a schematic cross-sectional view taken along line II-II of the cell shown in FIG. 1.

FIG. 2 is a schematic cross-sectional view taken along line II-II of the rolled cell element shown in FIG. 1. In the rolled cell element 120 shown in FIG. 2, a positive electrode 121 and a negative electrode 122 are arranged to oppose each other with a polymeric support layer (described in detail below) 123 and a separator 124 therebetween, and wound into a roll. The outermost peripheral portion is protected by a protective tape 125.

Figure 3:
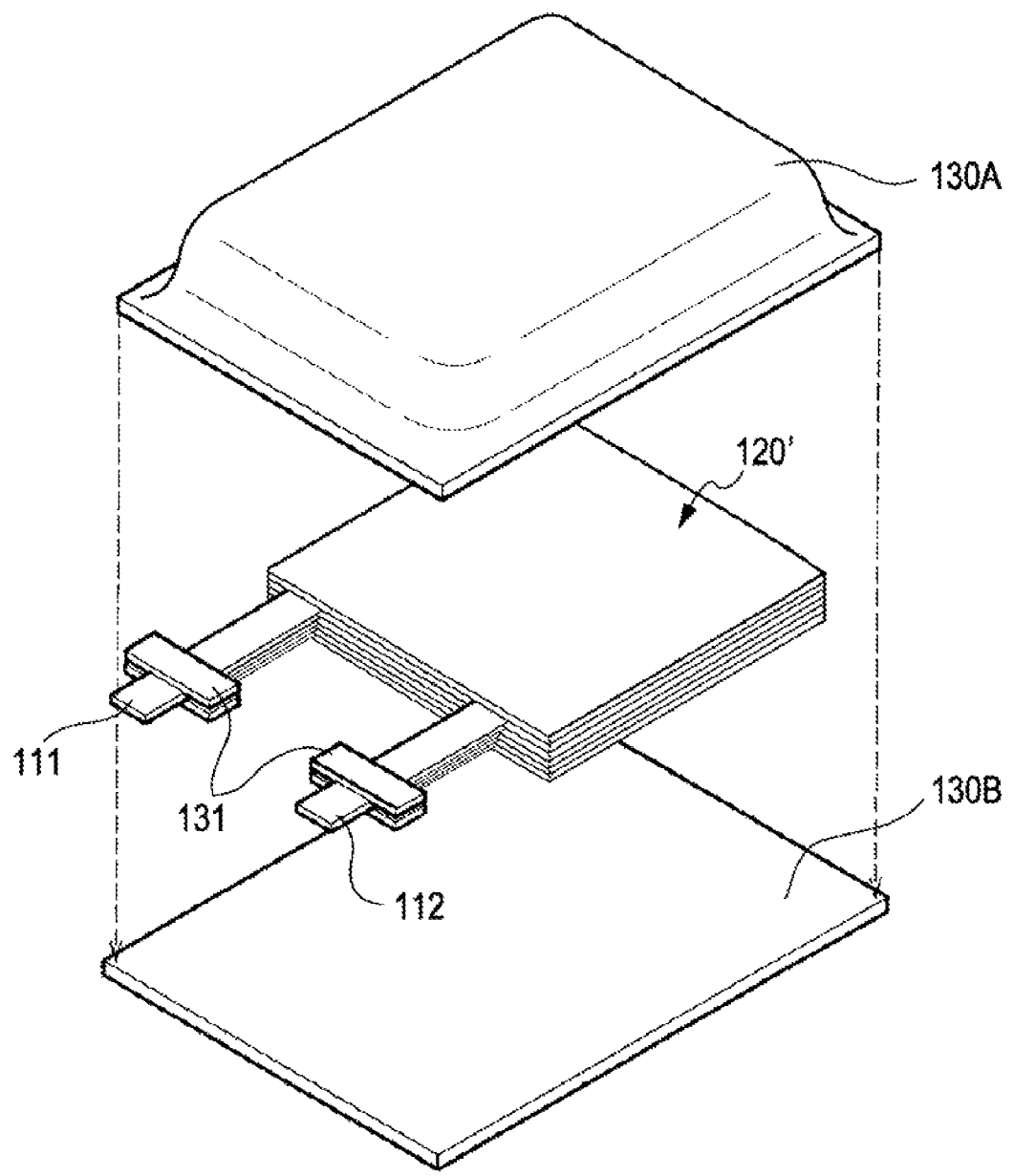
FIG. 3 is an exploded perspective view showing another example of a laminate-type secondary cell according to the first embodiment of the nonaqueous electrolyte secondary cell.

FIG. 3 is an exploded perspective view showing another example of the laminate-type secondary cell of the first embodiment. The components substantially the same as those of the rolled secondary cell described above are denoted by the same reference numerals and the descriptions therefor are omitted.

As shown in FIG. 3, this secondary cell has the same structure as the rolled secondary cell shown in FIG. 1 except that a multilayer cell element 120' is provided to replace the rolled cell element 120.

The multilayer cell element 120' includes sheet-shaped positive and negative electrodes opposing each other with a polymeric support retaining a nonaqueous electrolyte solution and a separator therebetween. For example, the multilayer cell element 120' has a multilayer structure in which a negative electrode sheet, a polymeric support layer, a separator, another polymeric support layer, and a positive electrode sheet are laminated in that order.

In the example shown in FIG. 3, the multilayer cell element 120' is a laminate of a negative electrode sheet and a positive electrode sheet stacked with a separator therebetween. Polymeric support layers are provided between the positive electrode sheet and the separator and between the negative electrode sheet and the separator. In other words, the constitutional elements of the multilayer cell element 120' are the multilayer electrode body and the nonaqueous electrolyte solution.

Since the multilayer cell element 120' has substantially the same configuration as that of the rolled cell element 120 shown in FIG. 1 except for the above-described feature, the description of the nonaqueous electrolyte secondary cell continues hereinafter by taking the example of the rolled cell element 120.

As shown in FIG. 2, the positive electrode 121 includes a positive electrode collector 121A having a pair of opposing faces and a positive electrode active material layer or layers 121B coating one or both faces of the positive electrode collector 121A. One end of the positive electrode collector 121A in the longitudinal direction is partly exposed from the positive electrode active material layer 121B, and the positive electrode terminal 111 is installed on this exposed portion.

The positive electrode collector 121A is composed of a metal foil such as an aluminum foil, a nickel foil, or a stainless steel foil.

The positive electrode active material layer 121B contains, as the positive electrode active material, at least one positive electrode material that can occlude and release lithium. The positive electrode active material layer 121B may further contain a conductive material and a binder if necessary.

Examples of the positive electrode material that can occlude and release lithium include sulfur (S), disulfides such as iron disulfide ($FeS_2$), titanium disulfide ($TiS_2$), molybdenum disulfide ($MOS_2$), and the like, and lithium-free chalcogenides (in particular, layer compounds and spinel compounds) such as niobium diselenide ($NbSe_2$), vanadium oxide ($V_2O_5$), titanium dioxide ($TiO_2$), and manganese dioxide ($MnO_2$), lithium-containing compounds, and conductive polymeric compounds such as polyaniline, polythiophene, polyacetylene, and polypyrrole.

Among these, lithium-containing compounds are preferred since they may give high voltage and high energy density. Examples of such lithium-containing compounds include compound oxides containing lithium and transition metal elements and phosphate compounds containing lithium and transition metal elements. From standpoint of achieving higher voltage, lithium-containing compounds containing any one or mixture of cobalt (Co), nickel (Ni), manganese (Mn), iron (Fe), copper (Cu), zinc (Zn), chromium (Cr), vanadium (V), and titanium (Ti) are preferred.

The lithium-containing compounds are typically represented by general formula (1) or (2) below:

$$Li_xMIO_2 \quad (1)$$

$$Li_yMIIPO_4 \quad (2)$$

(wherein MI and MII each represent at least one transition metal element; values of x and y usually satisfy $0.05 \leq x \leq 1.10$ and $0.05 \leq y \leq 1.10$ although these values may vary according to the charge-discharge state). A compound represented by (1) usually has a layer structure and a compound a compound represented by (2) usually has an olivine structure.

Specific examples of the compound oxide containing lithium and transition metal elements include lithium cobalt compound oxide ($Li_xCoO_2$), lithium nickel compound oxide ($Li_xNiO_2$), lithium nickel cobalt compound oxide ($Li_xNi_{1-z}Co_zO_2$ ($0<z<1$)), and a spinel-structure lithium manganese compound oxide ($LiMn_2O_4$).

Specific examples of the phosphate compound containing lithium and transition metals include a lithium iron phosphate compound ($LiFePO_4$) and lithium iron manganese phosphate compound ($LiFe_{1-v}Mn_vPO_4$ ($V<1$)) having an olivine structure.

Compounds obtained by partly replacing the transition metal of any one of the above compound oxides by aluminum, magnesium, or another transition metal element or allowing aluminum, magnesium, or another transition metal element to be contained in the crystal grain boundaries, or compounds obtained by partly replacing oxygen of the compound oxide with fluorine or the like may also be used. Furthermore, the surface of the positive electrode active material may be partly coated with another positive electrode active material. The positive electrode active material may be a mixture of a plurality of types of substances.

As with the positive electrode 121, the negative electrode 122 has a negative electrode collector 122A having a pair of opposing faces and a negative electrode active material layer or layers 122B coating one or both faces of the negative electrode collector 122A. One end of the negative electrode collector 122A in the longitudinal direction is partly exposed from the negative electrode active material layer 122B, and the negative electrode terminal 112 is installed on this exposed portion.

The negative electrode collector 122A is composed of a metal foil such as a copper foil, a nickel foil, or a stainless steel foil.

The negative electrode active material layer 122B contains, as the negative electrode active material, at least one of a negative electrode material that can occlude and release lithium and metallic lithium. The negative electrode active material layer 122B may contain a conductive material and a binder if necessary.

Examples of the negative electrode material that can occlude and release lithium include carbon materials, metal oxides, and polymeric compounds. Examples of the carbon materials include non-graphitizable carbon materials, artificial graphite materials, and graphite materials, in particular, pyrolytic carbon, coke, graphites, glassy carbons, organic polymer compound sinters, carbon fibers, activated carbon, and carbon black.

Examples of the coke include pitch coke, needle coke, and petroleum coke. Examples of the organic polymer compound sinters include carbons obtained by firing a polymeric material, such as phenol resin or furan resin, at an adequate temperature. Examples of the metal oxides include iron oxides, ruthenium oxides, and molybdenum oxides. Examples of the polymer compound include polyacetylene and polypyrrole.

Examples of the negative electrode material that can occlude and release lithium further include a material containing as the constitutional element at least one of metal or semi-metal elements that can form an alloy with lithium. The negative electrode material may be a single metal or semi-metal element, an alloy or compound of the metal or semi-metal element, or a material at least partly including at least one phase of the metal or semi-metal or the compound or alloy of the metal or semi-metal.

For the purpose of the description, "alloy" means a substance containing two or more metal elements or a substance containing at least one metal element and at least one semi-metal element. An alloy may further contain a non-metal element. Examples of the structure of the alloy include a solid solution, a eutectic mixture, and an intermetallic compound, and a structure containing two or more of these structures.

Examples of the metal and semi-metal elements include tin (Sn), lead (Pb), magnesium (Mg), aluminum (Al), indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Among these, group 14 metal or semi metal elements in the long periodic table are preferred, and silicon and tin are particularly preferred. This is because silicon and tin have high capacity to occlude and release lithium and achieve high energy density.

Examples of the tin alloys include alloys containing tin and at least one selected from the group consisting of silicon, magnesium, nickel, copper, iron, cobalt, manganese, zinc, indium, silver, titanium, germanium, bismuth, antimony and chromium as the second constitutional element.

Examples of the silicon alloys includes alloys containing silicon and at least one selected from the group consisting of tin, magnesium, nickel, copper, iron, cobalt, manganese, zinc, indium, silver, titanium, germanium, bismuth, antimony, and chromium as the second constitutional element.

Examples of the tin or silicon compounds include those containing oxygen (O) or carbon (C). The tin or silicon compounds may contain the second constitutional element described above in addition to tin or silicon.

The negative electrode material may be an element, such as titanium, that forms a compound oxide with lithium. Metallic lithium may be precipitated and dissolved and magnesium or aluminum in addition to lithium may be precipitated and dissolved.

The polymeric support layer 123 has ion conductivity and can retain a nonaqueous electrolyte solution. In the example shown in FIG. 2, the polymeric support layer 123 is adhered or bonded to the separator 124. Alternatively, the polymeric support layer 123 may be adhered or bonded to the separator and the electrode, as with the separator 124 and the positive electrode 121 and the separator 124 and the negative electrode 122 shown in FIG. 2. The polymeric support layer 123 may make no contact with the separator such that the polymeric support layer 123 is adhered or bonded to one or both of the positive electrode 121 and the negative electrode 122.

In the description "adhered to" means that the polymeric support layer 123 is in contact with the separator 124, the positive electrode 121, or the negative electrode 122 without a gap such that the polymeric support layer 123 and the separator 124 or the like do not move relative to each other unless a predetermined force is applied.

Since the polymeric support layer 123 is adhered or bonded to the separator 124 or the polymeric support layer 123 is adhered or bonded to the positive or negative electrode, once the polymeric support layer 123 retains a nonaqueous electrolyte solution and thereby becomes a gel-like nonaqueous electrolyte layer, the positive electrode 121 or the negative electrode 122 is bonded to the separator 124 through this nonaqueous electrolyte layer. The degree of bonding is preferably that the peel strength between the separator and the exposed portion of the positive electrode 121 or the negative electrode 122 exposing the collector from the active material layer is 5 mN/mm or more. The peel strength here is an average of the force required to peel the collector held on a stage from the separator by pulling at a rate of 10 cm/min in the 180° direction within the time period of 6 to 25 seconds from start of the pulling.

By adhering or bonding the polymeric support layer 123, the excess nonaqueous electrolyte solution that does not substantially contribute to cell reaction can be further reduced according to the embodiment shown in FIG. 2, and the nonaqueous electrolyte solution can be efficiently fed to around the electrode active material.

Thus, the nonaqueous electrolyte secondary cell according to the embodiment shown in FIG. 2 exhibits excellent cycle characteristics with a smaller amount of nonaqueous electrolyte and improved leaktightness since the amount of nonaqueous electrolyte used is small.

The polymeric support constituting the polymeric support layer is not particularly limited as long as it retains a nonaqueous electrolyte solution and exhibits ion conductivity. Examples thereof include acrylonitrile polymers containing at least 50% and more preferably at least 80% of acrylonitrile copolymer, aromatic polyamide, acrylonitrile/butadiene copolymer, acrylic polymers containing homopolymers or copolymers of acrylate or methacrylate, acryl amide polymers, fluorine-containing polymers such as vinylidene fluoride, polysulfone, and polyarylsulfone. In particular, a polymer prepared from 50% or more of acrylonitrile copolymers has a CN group in its side chain and exhibits high dielectric constant. Thus, a polymeric gel electrolyte having high ion conductivity can be produced.

In order to improve the nonaqueous electrolyte solution-retaining ability of these polymers and to increase the ion conductivity of the polymeric gel electrolyte made from these polymers, copolymers containing acrylonitrile and 50% or less, preferably 20% or less of a vinyl carboxylic acid such as acrylic acid, methacrylic acid, or itaconic acid, acrylamide, methacrylsulfonic acid, hydroxyalkylene glycol (meth)acrylate, alkoxyalkylene glycol (meth)acrylate, vinyl chloride, vinylidene chloride, vinyl acetate, or any of various (meth) acrylates can be used.

The aromatic polyamide is a polymeric compound preferred when a polymeric gel electrolyte with high heat resistance, such as one required for automobile cells, is desired since the aromatic polyamide is a highly heat resistant polymer. Cross-linked polymers obtained by copolymerizing aromatic polyamide with butadiene or the like may also be used.

In particular, polymers, i.e., homopolymers, copolymers, and multi-component copolymers, containing vinylidene fluoride as the constituent component are preferred. Specific examples thereof include polyvinylidene fluoride (PVdF), polyvinylidene fluoride-hexafluoropropylene copolymer (PVdF-HFP) and polyvinylidene fluoride-hexafluoropropylene-chlorotrifluoroethylene copolymer (PVdF-HEP-CTFE).

As the polymeric support for constituting the polymeric support layer, a support that has a melting point or gel melting point lower than that of the separator described below is preferably used. In other words, by rendering one end of the polymeric support having a lower melting point of gel melting point than the separator to project from a positive or negative electrode by 0.3 mm or more, the polymeric support layers can be melt-bonded to each other by the heat applied during cell fabrication. Thus, a secondary effect of improving safety upon dropping can be achieved. The secondary effect of improving safety upon dropping can also be achieved by making the width of the separator attached to the polymeric support layer larger than the internal dimension of the exterior package.

The separator 124 is composed of an insulating thin film having high ion permeability and a predetermined mechanical strength, such as a porous film composed of a polyolefin synthetic resin, e.g., polypropylene or polyethylene, a porous film composed of an inorganic material such as an ceramic unwoven cloth, or the like. The separator 124 may have a structure in which two or more types of these porous films are laminated. In particular, the separator 124 containing a polyolefin porous film is preferred since it has excellent capacity to separate the positive electrode 121 from the negative electrode 122 and to further reduce the internal shorts and a decrease in open circuit voltage.

The nonaqueous electrolyte solution may be any solution containing an electrolyte salt and a non-aqueous solvent.

The electrolyte salt may be any salt that generates ions by being dissolved or dispersed in the nonaqueous solvent described below. Although lithium hexafluorophosphate ($LiPF_6$) is preferred, the electrolyte salt is not limited to this.

Examples of the electrolyte salt include, but are not limited to, inorganic lithium salts such as lithium tetrafluoroborate ($LiBF_4$), lithium hexafluoroarsenate ($LiAsF_6$), lithium hexafluoroantimonate ($LiSbF_6$), lithium perchlorate ($LiClO_4$), and lithium tetrachloroaluminate ($LiAlCl_4$); lithium salts of perfluoroalkanesulfonate derivatives such as lithium trifluoromethanesulfonate ($LiCF_3SO_3$), lithium bis (trifluoromethanesulfone)imide ($LiN(CF_3SO_2)_2$), lithium bis (pentafluoromethanesulfone)imide ($LiN(C_2F_5SO_2)_2$) and lithium tris(trifluoromethanesulfone)methide ($LiC(CF_3 SO_2)_3$). These salts may be used alone or in combination of two or more.

The content of the electrolyte salt is preferably 0.1 mol to 3.0 mol and more preferably 0.5 mol to 2.0 mol per liter of the solvent. Within these ranges, high ion conductivity can be achieved.

Examples of the nonaqueous solvent include various high-dielectric-constant solvents and low-viscosity solvents.

Ethylene carbonate is preferred as the high-dielectric-constant solvent, but the high-dielectric-constant solvent is not limited to this. Other examples of the high-dielectric-constant solvent include cyclic carbonates such as propylene carbonate, butylene carbonate, vinylene carbonate, 4-fluoro-1,3-dioxolan-2-one (fluoroethylene carbonate), 4-chloro-1,3-dioxolan-2-one (chloroethylene carbonate), and trifluoromethylethylene carbonate.

In addition to or instead of the cyclic carbonate, a lactone such as such as γ-buryrolactone or γ-valerolactone, a lactam such as N-methylpyrrolidone, a cyclic carbamic ester such as N-methyloxazolidinone, or a sulfone compound such as tetramethylene sulfone can be used as the high-dielectric-constant solvent.

Diethyl carbonate is preferred as the low-viscosity solvent. Other examples of the usable low-viscosity solvent include chain carbonates such as dimethyl carbonate, ethyl methyl carbonate, and methyl propyl carbonate; chain carboxylic esters such as methyl acetate, ethyl acetate, methyl propionate, ethyl propionate, methyl butyrate, methyl isobutyrate, methyl trimethylacetate, and ethyl trimethylacetate; chain amides such as N,N-dimethylacetamide; chain carbamic esters such as methyl N,N-diethylcarbamate and ethyl N,N-diethylcarbamate; and ethers such as 1,2-dimethoxyethane, tetrahydrofuran, tetrahydropyran, and 1,3-dioxolane.

In the nonaqueous electrolyte solution used in the non-aqueous electrolyte secondary cell of the first embodiment, the high-dielectric-constant solvent and the low-viscosity solvent described above can be used alone or in combination of two types or more at any desired mixing ratio. Preferably, the nonaqueous electrolyte solution contains 20% to 50% of a cyclic carbonate and 50% to 80% of a low-viscosity solvent. In particular, a chain carbonate having a boiling point or 130° C. or less is preferably used as the low-viscosity solvent.

With such a nonaqueous electrolyte solution, the polymeric support can satisfactorily swell with a small amount of nonaqueous electrolyte, and suppression of swelling of the cell, prevention of leakage, and high conductivity can be achieved.

When the ratio of the cyclic carbonate to the low-viscosity solvent deviates from the above-described range, the conductivity of the electrolyte decreases, and the cycle characteristics may be degraded. In particular, with an excessively large amount of the low-viscosity solvent, the dielectric constant is decreased. In contrast, with an excessively small amount of the low-viscosity solvent, the viscosity is decreased. In either case, sufficient conductivity would not be obtained, and desirable cell characteristics would not be achieved.

According to the first embodiment, since the ratio (MO/MA) of the amount of the nonaqueous electrolyte solution between the electrode body and the exterior package is small, the swelling can be suppressed even when the low-viscosity solvent having a low boiling point is used in an amount of 50% or more.

Examples of the chain carbonates having a boiling point of 130° C. or less include dimethyl carbonate, ethyl methyl carbonate, and diethyl carbonate.

A halogen-containing cyclic carbonate derivative as the cyclic carbonate is preferably contained in the nonaqueous electrolyte solution, since the cycle characteristics can be further improved. Examples of the cyclic carbonate derivative include 4-fluoro-1,3-dioxolan-2-one and 4-chloro-1,3-dioxolan-2-one. These derivatives may be used alone or in combination. The derivative content is preferably 0.5% to 2%. At an excessively small derivative content, the effect of improving cycle characteristics is small, and at an excessively large derivative content, swelling during storage at high temperature becomes excessive.

An example of a method of making the secondary cell described above will now be described.

The rolled secondary cell can be made as follows.

First, the positive electrode 121 is prepared. In the case where a granular positive electrode active material is used, the positive electrode active material is mixed with a conducting material and a binder according to need to formulate a positive electrode mixture, and the positive electrode mixture is dispersed in a dispersion medium such as N-methyl-2-pyrrolidone to prepare a positive electrode mixture slurry. The positive electrode mixture slurry is applied and dried on the positive electrode collector 121A and press-formed to form the positive electrode active material layer 121B.

The negative electrode 122 is made as follows. In the case where a granular negative electrode active material is used, the negative electrode active material is mixed with a conductive material and a binder as needed to prepare a negative electrode mixture, and the negative electrode mixture is dispersed in a dispersion medium such as N-methyl-2-pyrrolidone to prepare a negative electrode mixture slurry. The negative electrode mixture slurry is applied and dried on the negative electrode collector 122A and press-formed into the negative electrode active material layer 122B.

The polymeric support layer 123 is then formed on the separator 124. Examples of the technique for forming the polymeric support layer 123 on the separator 124 include a technique of applying a polymeric support-containing solution on the surface of the separator 124 and removing the solvent therein and a technique of affixing a separately prepared polymeric support layer on the surface of the separator 124.

Examples of the technique for applying the polymeric support-containing solution on the surface of the separator 124 include a technique of immersing the separator in the polymeric support-containing solution, a technique of applying the solution by a T-die extrusion or the like, and a technique of applying the solution on a base surface by spraying or with a roll coater, a knife coater, or the like.

Examples of the technique for removing the solvent include a technique of removing the solvent by drying, a technique of immersing the applied solution layer in a poor solvent of the polymeric support to remove the solvent by extraction and then removing the poor solvent by drying, or a combination of these techniques.

Although it is possible to use an adhesive to render the separately prepared polymeric support layer to adhere on the surface of the separator 124, the selection of the adhesive should be carefully made according to the type of electrolyte used (acidic, alkaline, or organic solvent) and to prevent clogging.

An example of technique for allowing the polymeric support layer to adhere to the separator is heat-bonding at a temperature not lower than the gel transition point. In particular, heat-bonding under compression, such as hot roll compression, is preferred.

The positive electrode terminal 111 is then installed on the positive electrode 121, and the negative electrode terminal 112 is installed on the negative electrode 122. The separator 124 with the polymeric support layer 123, the positive electrode 121, another separator 124 with the polymeric support layer 123, and the negative electrode 122 are sequentially stacked and wound. The protective tape 125 is attached on the outermost peripheral portion to form a rolled electrode body. The rolled electrode body is interposed between the packaging members 130A and 130B, and the peripheral portions of the packaging members 130A and 130B are heat-bonded to each other while leaving one end open to form a bag.

An electrolyte salt such as lithium hexafluorophosphate and a nonaqueous electrolyte solution containing a nonaqueous solvent such as ethylene carbonate are prepared and poured into the rolled electrode body from the open end of the exterior package 130. The ratio (MO/MA) of the amount MO of the nonaqueous electrolyte solution existing between the electrode body and the exterior package to the amount MA of the nonaqueous electrolyte solution existing inside the exterior package varies according to the amount of the electrolyte solution in the cell, the type and amount of the polymeric support, and the method for making the cell. In order to reduce MO/MA to 0.04 or less, the amount of electrolyte solution may be decreased, a polymer having a high electrolyte-retaining ability may be used, the amount of the polymeric support may be increased, or the excess electrolyte may be removed by breaking the seal after fabrication of the cell. Lastly, the open end of the exterior package 130 is heat-sealed to enclose the cell body.

According to this process, the rolled secondary cell shown in FIGS. 1 and 2 in which the nonaqueous electrolyte solution is retained in the polymeric support layer 123 and the rolled cell element 120 constituted from the rolled electrode body and the nonaqueous electrolyte solution is accommodated in the exterior package 130 is obtained.

Since the electrolyte is formed by allowing the polymeric support to swell with an electrolyte solution to form a polymeric support layer after the polymeric support layer is formed and placed in the package, the precursor, which is a material for forming the polymeric support, and the solvent can be removed in advance so that no such material or solvent remains in the electrolyte. Furthermore, the process of forming the polymeric support can be adequately controlled. Thus, the polymeric support layer can adhere onto the separator, the positive electrode, and/or the negative electrode.

In the secondary cell described above, lithium ions are released from the positive electrode active material layer 121B upon charging and are occluded in the negative electrode active material layer 122B through the nonaqueous electrolyte solution retained in the polymeric support layer 123. Upon discharge, the lithium ions are released from the negative electrode active material layer 122B and are occluded in the positive electrode active material layer 121B through the polymeric support layer 123 and the nonaqueous electrolyte solution.

A nonaqueous electrolyte secondary cell according to a second embodiment will now be described in detail. In the description, "%" means percent by mass unless otherwise noted.

Figure 4:
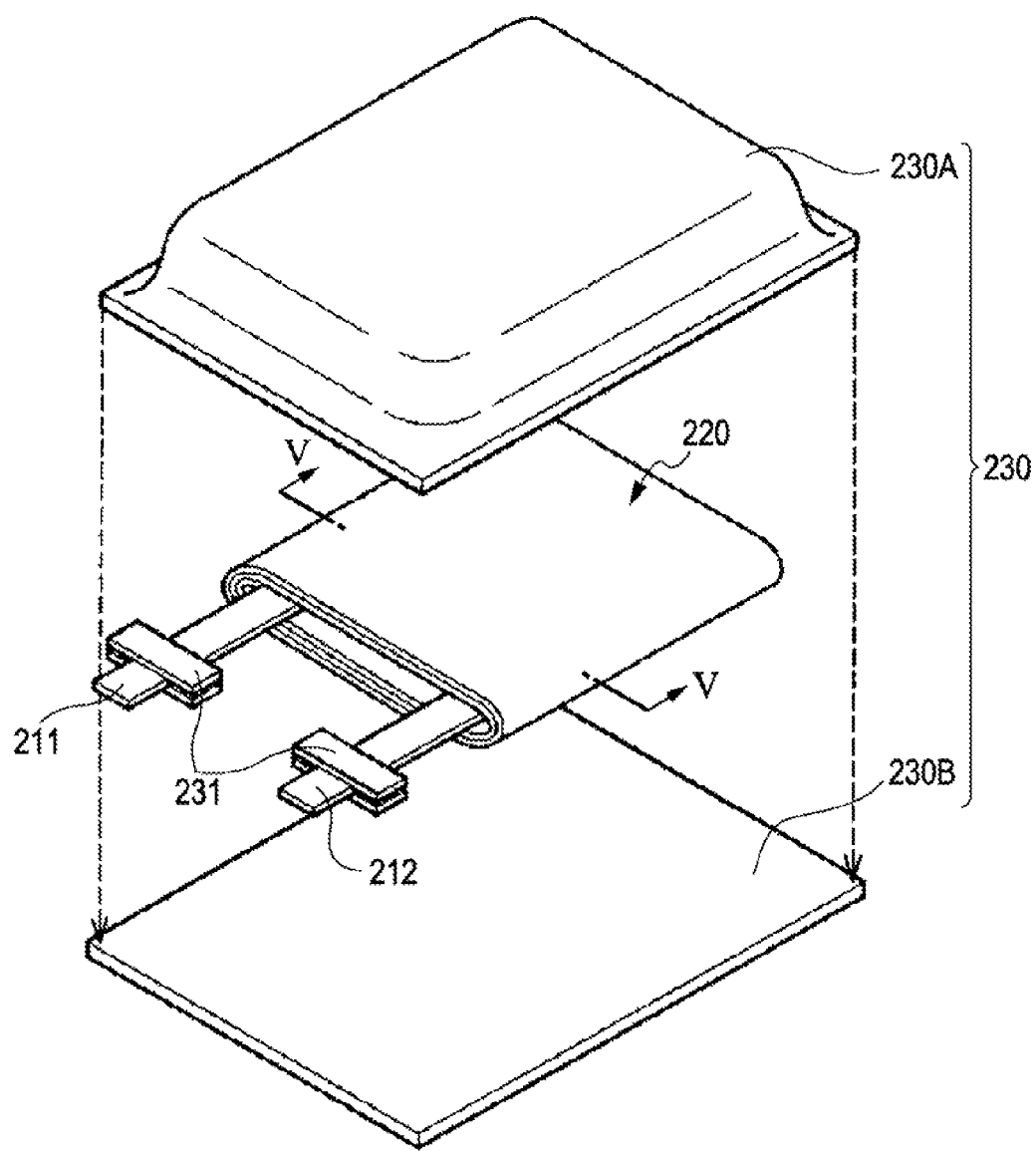
FIG. 4 is an exploded perspective view showing an example of a laminate-type secondary cell according to a second embodiment of the nonaqueous electrolyte secondary cell.

FIG. 4 is an exploded perspective view showing an example of the nonaqueous electrolyte secondary cell according to the second embodiment. This cell is of a rolled type and uses a laminated material.

In FIG. 4, the secondary cell includes a rolled cell element 220 having a positive electrode terminal 211 and a negative electrode terminal 212 and a film-shaped exterior package 230 (230A and 230B) enclosing the rolled cell element 220. The positive electrode terminal 211 and the negative electrode terminal 212 extend in, for example, the same direction from the interior of the exterior package 230 to the exterior. The positive electrode terminal 211 and the negative electrode terminal 212 are each composed of a metal material such as aluminum (Al), copper (Cu), nickel (Ni) or stainless steel.

The exterior package 230 is constituted from rectangular laminate films each produced by laminating a nylon film, an aluminum foil, and a polyethylene film in that order. The exterior package 230 is arranged such that the polyethylene film of each rectangular film faces the rolled cell element 220, and the peripheral portions of the laminated films are bonded to each other through heat bonding or with an adhesive.

Adhesive films 231 for preventing entry of outside air are interposed between the positive electrode terminal 211 and the rolled cell element 120 and between the exterior package 230 and the negative electrode terminal 212. Each adhesive film 231 is composed of a material having adhesiveness to the positive electrode terminal 211 and the negative electrode terminal 212. For example, if the positive electrode terminal 211 and the negative electrode terminal 212 are composed of the metal material described above, the adhesive film 231 is preferably composed of a polyolefin resin such as polyethylene, polypropylene, modified polyethylene, or modified polypropylene.

The exterior package 230 may be made of another material, e.g., a metal-free laminated film, a polymer film such as polypropylene film, or a metal film instead of the laminated film described above.

The exterior package 230 usually has a multilayer structure of exterior layer/metal foil/sealant layer (the exterior layer and the sealant layer may each be constituted from a plurality of layers). In the example described above, the nylon film corresponds to the exterior layer, the aluminum foil corresponds to the metal foil, and the polyethylene film corresponds to the sealant layer.

The metal foil desirably has a function of a moisture impermeable barrier film and may be a stainless steel foil, a nickel foil, or a plated iron film instead of the aluminum foil. An aluminum film which is thin, light-weight, and superior in workability is preferred.

Examples of the structure of the exterior package 230 employable include, in terms of (external layer/metal foil/sealant layer), nylon (Ny)/aluminum (Al)/cast polypropylene (CPP), polyethylene terephthalate (PET)/Al/CPP, PET/Al/PET/CPP, PET/Ny/Al/CPP, PET/Ny/Al/Ny/CPP, PET/Ny/Al/Ny/polyethylene (PE), Ny/PE/Al/linear low-density polyethylene (LLDPE), PET/PE/Al/PET/low-density polyethylene (LDPE), and PET/Ny/Al/LDPE/CPP.

Figure 5:
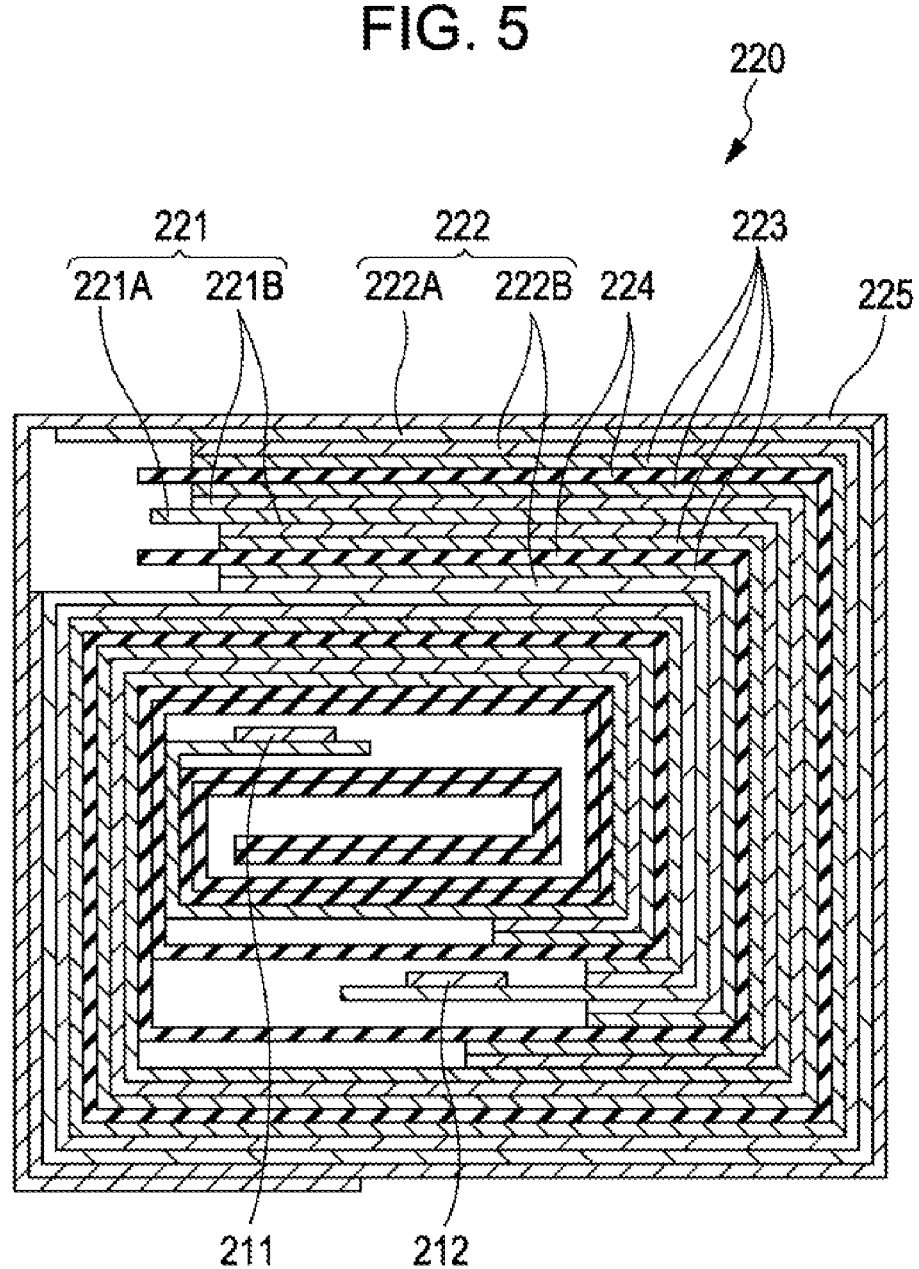
FIG. 5 is a schematic cross-sectional view taken along line V-V of the cell shown in FIG. 4.

FIG. 5 is a perspective cross-sectional view of the cell element 220 shown in FIG. 4 taken along line V-V in FIG. 4. In FIG. 5, a positive electrode 221 faces a negative electrode 222 with a polymeric support layer 223 (described below) retaining a nonaqueous electrolyte solution and a separator 224 therebetween. The positive electrode 221 and the negative electrode 222 are wound into a roll, the outermost peripheral portion of which is protected by a protective tape 225.

Figure 6:
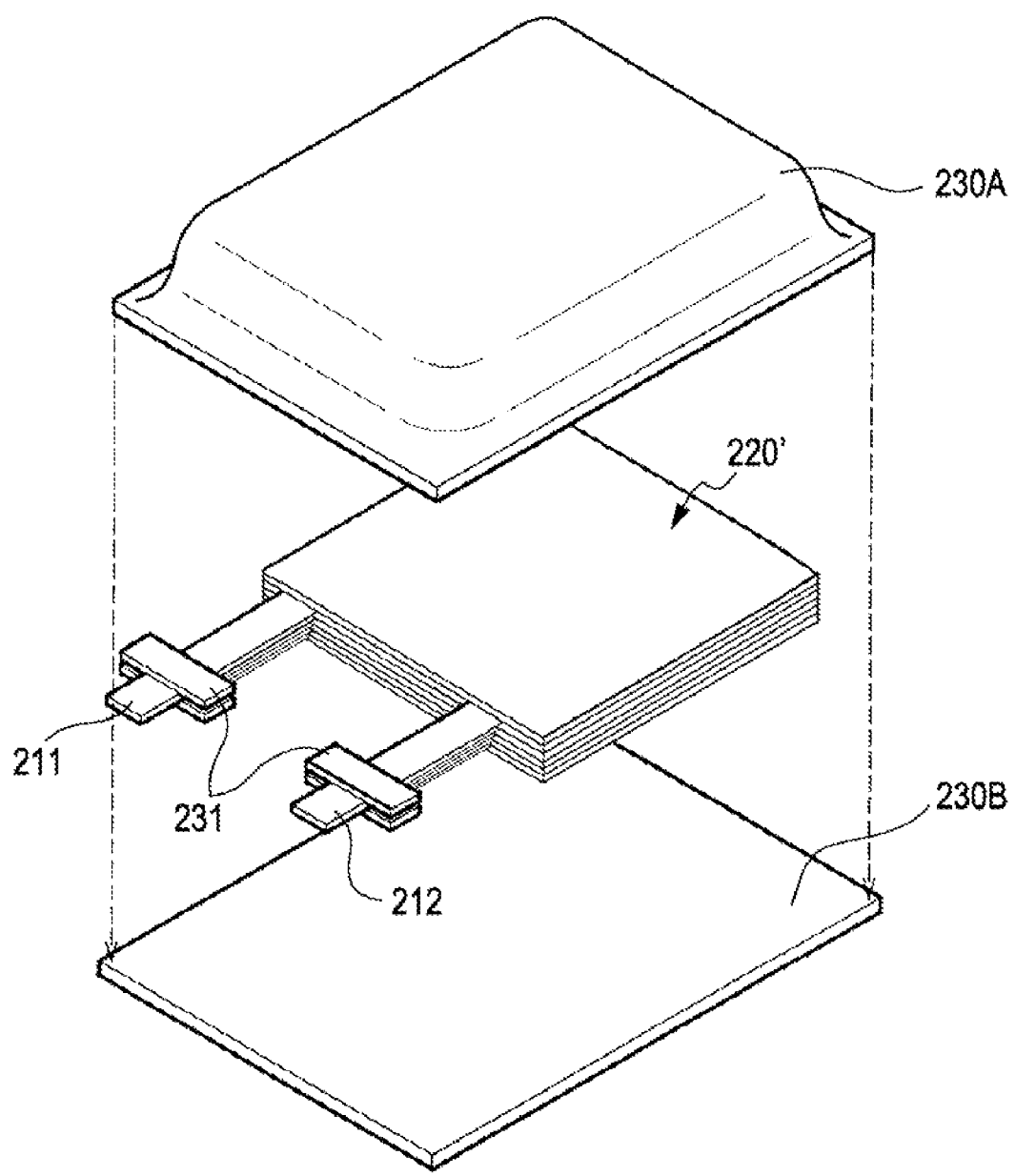
FIG. 6 is an exploded perspective view showing another example of a laminate-type secondary cell according to the second embodiment of the nonaqueous electrolyte secondary cell.

FIG. 6 is an exploded perspective view of another example of the nonaqueous electrolyte secondary cell of this embodiment. The nonaqueous electrolyte secondary cell shown in FIG. 6 is of a laminated type using a laminated material. The components substantially the same as those in the rolled secondary cell described above are represented by the same reference numerals and the descriptions therefor are omitted.

As shown in FIG. 6, this cell has the same structure as the rolled cell shown in FIG. 4 except that a multilayer cell element 220' is provided instead of the rolled cell element 220.

The multilayer cell element 220' has a positive electrode sheet and a negative electrode sheet facing each other with a polymeric support layer retaining the nonaqueous electrolyte solution and the separator therebetween. For example, the multilayer cell element 220' has a multilayer structure formed by laminating a negative electrode sheet, a polymeric support layer, a separator, another polymeric support layer, and a positive electrode sheet in that order.

In the example shown in FIG. 6, the multilayer cell element 220' is prepared by stacking a negative electrode sheet and a positive electrode sheet with a separator therebetween. Moreover, polymeric support layers are interposed between the positive electrode sheet and the separator and between the negative electrode sheet and the separator.

The multilayer cell element 220' has substantially the same structure as the rolled cell shown in FIG. 4 except for the aforementioned point. Thus, the nonaqueous electrolyte secondary cell of the second embodiment is described below by taking an example from the rolled secondary cell described above.

As shown in FIG. 5, the positive electrode 221 includes a positive electrode collector 221A having a pair of opposing faces and a positive electrode active material layer or layers 221B covering one or both faces of the positive electrode collector 221A. One end of the positive electrode 221 in the longitudinal direction has an exposed portion from the positive electrode active material layer 221B, and a positive electrode terminal 211 is installed to this exposed portion.

The positive electrode collector 221A is composed of a metal foil such as an aluminum foil, a nickel foil, or a stainless steel foil.

The positive electrode active material layer 221B contains at least one type of positive electrode materials that can occlude and release lithium ions and may further contain a conductive material and a binder if necessary.

Examples of the positive electrode material that can occlude and release lithium include sulfur (S), disulfides such as iron disulfide (FeS$_2$), titanium disulfide (TiS$_2$), molybdenum disulfide (MOS$_2$), and the like, and lithium-free chalocogenides (in particular, layer compounds and spinel compounds) such as niobium diselenide (NbSe$_2$), vanadium oxide (V$_2$O$_5$), titanium dioxide (TiO$_2$), and manganese dioxide (MnO$_2$), lithium-containing compounds, and conductive polymeric compounds such as polyaniline, polythiophene, polyacetylene, and polypyrrole.

Among these, lithium-containing compounds are preferred since they may give high voltage and high energy density. Examples of such lithium-containing compounds include compound oxides containing lithium and transition metal elements and phosphate compounds containing lithium and transition metal elements. From standpoint of achieving higher voltage, lithium-containing compounds containing any one or mixture of cobalt (Co), nickel (Ni), manganese (Mn), iron (Fe), copper(Cu), zinc (Zn), chromium (Cr), vanadium (V), and titanium (Ti) are preferred.

The lithium-containing compounds are typically represented by general formula (1) or (2) below:

$$Li_xMIO_2 \quad (1)$$

$$Li_yMIIPO_4 \quad (2)$$

(wherein MI and MII each represent at least one transition metal element; values of x and y usually satisfy $0.05 \leq x \leq 1.10$ and $0.05 \leq y \leq 1.10$ although these values may vary according to the charge-discharge state). A compound represented by (1) usually has a layer structure and a compound a compound represented by (2) usually has an olivine structure.

Specific examples of the compound oxide containing lithium and transition metal elements include lithium cobalt compound oxide (LixCoO$_2$), lithium nickel compound oxide (Li$_x$NiO$_2$), lithium nickel cobalt compound oxide (Li$_x$Ni$_{1-z}$Co$_z$O$_2$ ($0<z<1$)), and a spinel-structure lithium manganese compound oxide (LiMn$_2$O$_4$).

Specific examples of the phosphate compound containing lithium and transition metals include a lithium iron phosphate (LiFePO$_4$) and lithium iron manganese phosphate (LiFe$_{1-v}$Mn$_v$PO$_4$ ($V<1$)) having an olivine structure.

Compounds obtained by partly replacing the transition metal of the compound oxide by aluminum, magnesium, or another transition metal element or allowing aluminum, magnesium, or another transition metal element to be contained in the crystal grain boundaries, or compounds obtained by partly replacing oxygen of the compound oxide with fluorine or the like may also be used. Furthermore, the surface of the positive electrode active material may be partly coated with another positive electrode active material. The positive electrode active material may be a mixture of a plurality of types of substances.

As with the positive electrode 221, the negative electrode 222 has a negative electrode collector 222A having a pair of opposing faces and a negative electrode active material layer or layers 222B coating one or both faces of the negative electrode collector 222A. One end of the negative electrode collector 222A in the longitudinal direction is partly exposed from the negative electrode active material layer 222B, and the negative electrode terminal 212 is installed on this exposed portion.

The negative electrode collector 222A is composed of a metal foil such as a copper foil, a nickel foil, or a stainless steel foil.

The negative electrode active material layer 222B contains, as the negative electrode active material, at least one of a negative electrode material that can occlude and release lithium and metallic lithium. The negative electrode active material layer 222B may further contain a conductive material and a binder if necessary.

Examples of the negative electrode material that can occlude and release lithium include carbon materials, metal oxides, and polymeric compounds. Examples of the carbon materials include non-graphitizable carbon materials, artificial graphite materials, and graphite materials, in particular, pyrolytic carbon, coke, graphites, glassy carbons, organic polymer compound sinters, carbon fibers, activated carbon, and carbon black.

Examples of the coke include pitch coke, needle coke, and petroleum coke. Examples of the organic polymer compound sinters include carbons obtained by firing a polymer material such as phenol resin or furan resin at an adequate temperature. Examples of the metal oxide include iron oxides, ruthenium oxides, and molybdenum oxides. Examples of the polymer compound include polyacetylene and polypyrrole.

Examples of the negative electrode material that can occlude and release lithium include materials containing as a constitutional element at least one of metal elements and semimetal elements that can form alloys with lithium. The negative electrode material may be a metal or semimetal element, an alloy thereof, or a compound thereof, and a material containing one or more of these phases in at least part of the material is also usable.

For the purpose of the description, "alloy" means a substance containing two or more metal elements or a substance containing at least one metal element and at least one semimetal element. An alloy may further contain a non-metal element. Examples of the structure of the alloy include a solid solution, an eutectic mixture, and an intermetallic compound, and a structure containing two or more of these structures.

Examples of the metal and semi-metal elements include tin (Sn), lead (Pb), aluminum (Al), indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Among these, group 14 metal or semi metal elements in the long periodic table are preferred, and silicon and tin are particularly preferred. This is because silicon and tin have high capacity to occlude and release lithium and achieves high energy density.

Examples of the tin alloys include alloys containing tin and at least one selected from the group consisting of silicon, magnesium, nickel, copper, iron, cobalt, manganese, zinc, indium, silver, titanium, germanium, bismuth, antimony and chromium as the second constitutional element.

Examples of the silicon alloys includes alloys containing silicon and at least one selected from the group consisting of tin, magnesium, nickel, copper, iron, cobalt, manganese, zinc, indium, silver, titanium, germanium, bismuth, antimony, and chromium as the second constitutional element.

Examples of the tin or silicon compounds include those containing oxygen (O) or carbon (C). The tin or silicon compounds may contain the second constitutional element described above in addition to tin or silicon.

The polymeric support layer 223 has ion conductivity and can retain a nonaqueous electrolyte. In the embodiment shown in FIG. 5, the polymeric support layer 223 is adhered or bonded to the separator 224. Alternatively, the polymeric support layer 223 may be adhered or bonded to the separator and the electrode, as with the separator 224 and the positive electrode 221 and the separator 224 and the negative electrode 222 shown in FIG. 2. The polymeric support layer 223 may make no contact with the separator such that the polymeric support layer 223 is adhered or bonded to one or both of the positive electrode 221 and the negative electrode 222.

In the description "adhered to" means that the polymeric support layer 223 is in contact with the separator 224, the positive electrode 221, or the negative electrode 222 without a gap such that the polymeric support layer 223 and the separator 224 or the like do not move relative to each other unless a predetermined force is applied.

Since the polymeric support layer 223 is adhered or bonded to the separator 224 or the polymeric support layer 223 is adhered or bonded to the positive or negative electrode, once the polymeric support layer 223 retains a nonaqueous electrolyte and thereby becomes a gel-like nonaqueous electrolyte layer, the positive electrode 221 or the negative electrode 222 is bonded to the separator 224 through this nonaqueous electrolyte layer. The degree of bonding is preferably that the peel strength between the separator and the exposed portion of the positive electrode 221 or the negative electrode 222 exposing the collector from the active material layer is 5 mN/mm or more. The peel strength here is an average of the force required to peel the collector held on a stage from the separator by pulling at a rate of 10 cm/min in the 180° direction within the time period of 6 to 25 seconds from the start of the pulling.

By adhering or bonding the polymeric support layer, the excess nonaqueous electrolyte that does not substantially contribute to cell reaction can be further reduced according to this embodiment, and the nonaqueous electrolyte can be efficiently fed to around the electrode active material.

Thus, the nonaqueous electrolyte secondary cell according to this embodiment exhibits excellent cycle characteristics with a smaller amount of nonaqueous electrolyte and improved leaktightness since the amount of nonaqueous electrolyte used is small.

The polymeric support constituting the polymeric support layer is not particularly limited as long as it retains a nonaqueous electrolyte and exhibits ion conductivity. Examples thereof include acrylonitrile polymers containing at least 50% and more preferably at least 80% of acrylonitrile copolymer, aromatic polyamide, acrylonitrile/butadiene copolymer, acrylic polymers containing homopolymers or copolymers of acrylate or methacrylate, acryl amide polymers, fluorine-containing polymers such as vinylidene fluoride, polysulfone, and polyarylsulfone. In particular, a polymer containing 50% or more of acrylonitrile copolymers has a CN group in its side chain and exhibits high dielectric constant. Thus, a polymeric gel electrolyte having high ion conductivity can be produced.

In order to improve the nonaqueous electrolyte-retaining ability of these polymers and to increase the ion conductivity of the polymeric gel electrolyte made from these polymers, copolymers containing acrylonitrile and 50% or less, preferably 20% or less of a vinyl carboxylic acid such as acrylic acid, methacrylic acid, or itaconic acid, acrylamide, methacrylsulfonic acid, hydroxyalkylene glycol (meth)acrylate, alkoxyalkylene glycol (meth)acrylate, vinyl chloride, vinylidene chloride, vinyl acetate, or any of various (meth)acrylates can be used.

The aromatic polyamide is a polymeric compound preferred when a polymeric gel electrolyte with high heat resistance, such as one required for automobile cells, is desired since the aromatic polyamide is a highly heat resistant polymer. Cross-linked polymers obtained by copolymerizing aromatic polyamide with butadiene or the like may also be used.

In particular, polymers, i.e., homopolymers, copolymers, and multi-component copolymers, containing vinylidene fluoride as the constituent component are preferred. Specific examples include polyvinylidene fluoride (PVdF), polyvinylidene fluoride-hexafluoropropylene copolymer (PVdF-HFP) and polyvinylidene fluoride-hexafluoropropylene-chlorotrifluoroethylene copolymer (PVdF-HEP-CTFE).

The separator 224 is composed of an insulating thin film having high ion permeability and a predetermined mechanical strength, such as a porous film composed of a polyolefin synthetic resin, e.g., polypropylene or polyethylene, a porous film composed of an inorganic material such as an ceramic unwoven cloth, or the like. The separator 224 may have a structure in which two or more types of these porous films are laminated. In particular, the separator 224 containing a polyolefin porous film is preferred since it has excellent capacity to separate the positive electrode 221 from the negative electrode 222 and to further reduce the internal shorts and a decrease in open circuit voltage.

The nonaqueous solvent contained in the nonaqueous electrolyte solution used in the nonaqueous electrolyte secondary cell of the second embodiment is a solvent containing 20% to 50% of cyclic carbonate and 50% to 80% of low-viscosity nonaqueous solvent.

The low-viscosity nonaqueous solvent is preferably a chain carbonate having a boiling point of 130° C. or less.

Ethylene carbonate, propylene carbonate, and the like are preferred as the cyclic carbonate but the cyclic carbonate is not limited to these. Other examples of the cyclic carbonate butylene carbonate, vinylene carbonate, 4-fluoro-1,3-dioxolan-2-one (fluoroethylene carbonate), 4-chloro-1,3-dioxolan-2-one (chloroethylene carbonate), and trifluoromethylethylene carbonate. These may be used alone or in combination of two or more.

The cyclic carbonate is used in an amount of 20% to 50% and preferably 25% to 40% in terms of mass ratio. When the amount of the cyclic carbonate is less than 20%, the percentage of the low-viscosity nonaqueous solvent described below increases relatively, thereby resulting in a decreased degree of dissociation of lithium ions and a decreased conductivity of the electrolyte solution. At an amount exceeding 50%, the percentage of the low-viscosity nonaqueous solvent decreases relatively, thereby resulting in an increased viscosity and a decreased conductivity of the electrolyte solution.

Diethyl carbonate and ethyl methyl carbonate are preferred as the low-viscosity nonaqueous solvent. Other examples of the usable low-viscosity nonaqueous solvent include chain carbonates such as dimethyl carbonate and methyl propyl carbonate; chain carboxylic esters such as methyl acetate, ethyl acetate, methyl propionate, ethyl propionate, methyl butyrate, methyl isobutyrate, methyl trimethylacetate, and ethyl trimethylacetate; chain amides such as N,N-dimethylacetamide; chain carbamic esters such as methyl N,N-diethylcarbamate and ethyl N,N-diethylcarbamate; and ethers such as 1,2-dimethoxyethane, tetrahydrofuran, tetrahydropyran, and 1,3-dioxolane. These may be used alone or in any combination of two or more.

The low-viscosity nonaqueous solution is mixed at a ratio by mass in the range of 50% to 80% and preferably 60% to 75%.

A chain carbonate having a boiling point of 130° C. or less is preferred as the low-viscosity nonaqueous solvent described above since the conductivity of the nonaqueous electrolyte solution can be increased. Examples of the chain carbonate include dimethyl carbonate, ethyl methyl carbonate, and diethyl carbonate.

If a chain carbonate having a boiling point exceeding 130° C. is used as the low-viscosity nonaqueous solvent, then it is possible that the operation temperature range of the cell is narrowed.

With the nonaqueous electrolyte solution described above, the polymeric support can satisfactorily swell with a small amount of nonaqueous electrolyte solution. Thus, suppression and prevention of the swelling of the cell and high electrical conductivity can both be achieved.

The nonaqueous electrolyte solution preferably contains a halogen-containing cyclic carbonic ester derivative as the cyclic carbonate since the cycle characteristics can be improved.

Examples of the cyclic carbonic ester derivative include 4-fluoro-1,3-dioxolan-2-one and 4-chloro-1,3-dioxolan-2-one, which may be used alone or in combination. The total derivative content is preferably about 0.5% to 2%. At a total amount below this range, the effect of improving the cycle characteristics may be insufficient. At a total amount exceeding this range, the cell tends to excessively swell during storage at high temperature.

The electrolyte salt contained in the nonaqueous electrolyte solution may be any that generates ions by being dissolved or dispersed in the nonaqueous solvent described above. Although lithium hexafluorophosphate ($LiPF_6$) is preferred, the electrolyte salt is not limited to this.

Examples of the electrolyte salt include, but are not limited to, inorganic lithium salts such as lithium tetrafluoroborate ($LiBF_4$), lithium hexafluoroarsenate ($LiAsF_6$), lithium hexafluoroantimonate ($LiSbF_6$), lithium perchlorate ($LiClO_4$), and lithium tetrachloroaluminate ($LiAlCl_4$); lithium salts of perfluoroalkanesulfonate derivatives such as lithium trifluoromethanesulfonate ($LiCF_3SO_3$), lithium bis(trifluoromethanesulfone)imide ($LiN(CF_3SO_2)_2$), lithium bis(pentafluoromethanesulfone)imide ($LiN(C_2F_5SO_2)_2$) and lithium tris(trifluoromethanesulfone)methide ($LiC(CF_3SO_2)_3$). These salts may be used alone or in combination of two or more.

The content of the electrolyte salt is preferably 5% to 25%. At an electrolyte salt content of less than 5%, the electrical conductivity may be insufficient. At an electrolyte content exceeding 25%, the viscosity may excessively increase.

The nonaqueous electrolyte solution used in the nonaqueous electrolyte secondary cell of the second embodiment contains an electrolyte salt in a nonaqueous solvent of a particular composition as discussed above. The amount of the nonaqueous electrolyte solution charged in the cell is preferably 0.14 g or more and 0.35 g or less and more preferably 0.22 g or more and 0.32 g or less per cubic centimeter of the volume of the cell.

When the amount of the nonaqueous electrolyte solution poured is less than 0.14 g per unit volume, desired cell performance is rarely achieved. When the amount exceeds 0.35 g, the leaktightness is degraded.

An example of a method of making the secondary cell described above will now be described.

The laminated secondary cell can be made as follows.

First, the positive electrode 221 is prepared. In the case where a granular positive electrode active material is used, the positive electrode active material is mixed with a conducting material and a binder according to need to formulate a positive electrode mixture, and the positive electrode mixture is dispersed in a dispersion medium such as N-methyl-2-pyrrolidone to prepare a positive electrode mixture slurry.

The positive electrode mixture slurry is applied and dried on the positive electrode collector 221A and press-formed to form the positive electrode active material layer 221B.

The negative electrode 222 is made as follows. In the case where a granular negative electrode active material is used, the negative electrode active material is mixed with a conductive material and a binder as needed to prepare a negative electrode mixture, and the negative electrode mixture is dispersed in a dispersion medium such as N-methyl-2-pyrrolidone to prepare a negative electrode mixture slurry. The negative electrode mixture slurry is applied and dried on the negative electrode collector 222A and press-formed into the negative electrode active material layer 222B.

The polymeric support layer 223 is then formed on the separator 224. Examples of the technique for forming the polymeric support layer 223 on the separator 224 include a technique of applying a polymeric support-containing solution on the surface of the separator 224 and removing the solvent therein and a technique of affixing a separately prepared polymeric support layer on the surface of the separator 224.

Examples of the technique for applying the polymeric support-containing solution on the surface of the separator 224 include a technique of immersing the separator in the polymeric support-containing solution, a technique of applying the solution by a T-die extrusion or the like, and a technique of applying the solution on a base surface by spraying or with a roll coater, a knife coater, or the like.

Examples of the technique for removing the solvent include a technique of removing the solvent by drying, a technique of immersing the applied solution layer in a poor solvent of the polymeric support to remove the solvent by extraction and then removing the poor solvent by drying, or a combination of these techniques.

Although it is possible to use an adhesive to render the separately prepared polymeric support layer to adhere to the surface of the separator 224, the selection of the adhesive should be carefully made according to the type of electrolyte used (acidic, alkaline, or organic solvent) and to prevent clogging.

An example of technique for allowing the polymeric support layer to adhere to the separator is heat-bonding at a temperature not lower than the gel transition point. In particular, heat-bonding under compression, such as hot roll compression, is preferred.

The positive electrode terminal 211 is then installed on the positive electrode 221, and the negative electrode terminal 212 is installed on the negative electrode 222. The separator 224 with the polymeric support layer 223, the positive electrode 221, another separator 224 with the polymeric support layer 223, and the negative electrode 222 are sequentially stacked and wound. The protective tape 225 is attached on the outermost peripheral portion to form a rolled electrode body. The rolled electrode body is interposed between the packaging members 230A and 230B, and the peripheral portions of the packaging members 230A and 230B are heat-bonded to each other while leaving one end open to form a bag.

An electrolyte salt such as lithium hexafluorophosphate and a nonaqueous electrolyte containing nonaqueous solvent such as ethylene carbonate are prepared and poured into the rolled electrode body from the open end of the exterior package 230. The open end of the exterior package 230 is heat-sealed to enclose the cell body. As a result, the polymeric support layer 223 is retained in the polymeric support layer 223 and a secondary cell shown in FIGS. 4 and 5 is obtained.

Since the electrolyte is formed by providing an electrolyte solution to the polymeric support layer after the polymeric support layer is formed and placed in the package, the precursor, which is a material for forming the polymeric support, and the solvent can be removed in advance so that no such material or solvent remains in the electrolyte. Furthermore, the process of forming the polymeric support can be adequately controlled. Thus, the polymeric support layer can adhere to the separator, the positive electrode, and/or the negative electrode.

In the secondary cell described above, lithium ions are released from the positive electrode active material layer 221B upon charging and are occluded in the negative electrode active material layer 222B through the nonaqueous electrolyte solution retained in the polymeric support layer 223. Upon discharge, the lithium ions are released from the negative electrode active material layer 222B and are occluded in the positive electrode active material layer 221B through the polymeric support layer 223 and the nonaqueous electrolyte solution.

EXAMPLES

The first embodiment will now be described in detail by using Examples and Comparative Examples. The first embodiment is by no means limited by these examples.

In particular, the operation described below was conducted, the rolled secondary cell as shown in FIGS. 1 and 2 was fabricated, and the performance of the cell was evaluated.

Example 1

Preparation of Positive Electrode

Per mole of cobalt carbonate ($CoCO_3$), 0.5 mol of lithium carbonate ($LiCO_3$) was mixed, and the resulting mixture was fired at 900° C. for 5 hours to obtain a lithium cobalt compound oxide ($LiCoO_2$) as the positive electrode active material.

Next, 85 parts by mass of the lithium cobalt compound oxide obtained, parts by mass of graphite serving as a conductive agent, and 10 parts by mass of polyvinylidene fluoride serving as a binder were homogeneously mixed to prepare a positive electrode mixture, and the positive electrode mixture was dispersed in a dispersion medium, N-methyl-2-pyrrolidone to obtain a positive electrode mixture slurry.

The positive electrode mixture slurry was evenly applied on both faces of the positive electrode collector which is a 20 μm-thick aluminum foil, dried, and press-formed with a roll press to form a positive electrode active material layers to thereby form a positive electrode. A positive electrode terminal was then attached to the positive electrode.

Preparation of Negative Electrode

A pulverized graphite powder was prepared as a negative electrode active material, and 90 parts by mass of the graphite powder and 10 parts by mass of polyvinylidene fluoride serving as a binder were homogenously mixed to prepare a negative electrode mixture, and the negative electrode mixture was dispersed in a dispersion medium N-methyl-2-pyrrolidone to obtain a negative electrode mixture slurry.

The negative electrode mixture slurry was evenly applied on both faces of the negative electrode collector which was a 15 μm-thick copper foil, dried, and press-formed with a roll press to prepare a negative electrode active material layers and to thereby prepare a negative electrode. A negative electrode terminal was then attached on the negative electrode.

Providing Polymeric Support

To 100 parts by mass of N-methyl-2-pyrrolidone, 15 parts by mass of a polyvinylidene fluoride-hexafuloropropylene (PVdF-HFP) copolymer was added to prepare a polymer solution, and the polymer solution was applied on both faces of a separator made of a 20 μm-thick microporous polyethylene film using a coater. The polyethylene film was immersed in deionized water and dried so that a polymeric support layer having a thickness of 5 μm was formed on each face of the separator made of the polyethylene film.

Preparation of Cell

The positive electrode and the negative electrode prepared as above were bonded to each other with the separator therebetween and wound in the longitudinal direction. A protective tape was applied on the outermost periphery to obtain a rolled electrode body.

The rolled electrode body was interposed between the packaging members, and the three sides thereof were heat-bonded to form a bag. The packaging members were each a moisture-resistant aluminum laminated film constituted from a 20 μm-thick nylon film, a 40 μm-thick aluminum foil, and a 30 μm-thick polypropylene film stacked in that order from the outermost layer side.

Subsequently, 1.6 mL of the nonaqueous electrolyte solution was poured into the bag, and the remaining open side was heat-bonded under a reduced pressure to provide hermetic seal. The nonaqueous electrolyte solution used here was prepared by dissolving 1.2 mol of lithium hexafluorophosphate per liter of an ethylene carbonate 4/diethyl carbonate 6 (ratio by mass) mixture solvent.

The resulting product was interposed between iron plates and heated at 70° C. for 3 minutes so that the positive electrode and the negative electrode are bonded to the separator with the polymeric support layers therebetween.

As a result, a nonaqueous electrolyte secondary cell (width: 34 mm, length: 50 mm, thickness: 50 mm) of an example shown in FIGS. 1 and 2 was obtained.

The mass of the nonaqueous electrolyte secondary cell was measured, and the electrode body was taken out. The electrode body was disassembled into the positive electrode, the negative electrode, and the separator, and the positive electrode, the negative electrode, the separator, and the exterior package were immersed in a dimethyl carbonate solution for 2 days, followed by filtration and vacuum-drying for three days. The mass of the cell after vacuum drying was measured and subtracted from the initial mass to determine MA.

The mass of the cell is measured, and the electrode body was taken out. The electrode body was interposed between materials, such as cloths, that can absorb the nonaqueous electrolyte solution, and put under a load of 10 kPa. The nonaqueous electrolyte solution squeezed out was wiped away. The exterior package from which the electrode body was taken out was immersed in a dimethyl carbonate solution and dried. The total mass of the exterior package and the electrode body after the wiping was determined and subtracted from the initial mass of the cell to determine MO. The ratio MO/MA was 0.030.

Comparative Examples 1 to 3

Nonaqueous electrolyte secondary cells of Comparative Examples 1 to 3 were made by the same process as in Example 1 except that the amount of the solution poured was changed as shown in Table 1. MA and MO were determined as in Example 1. The ratio MO/MA is shown in Table 1.

Examples 2 to 7 and Comparative Examples 4 to 6

Nonaqueous electrolyte secondary cells of Examples 2 to 7 and Comparative Examples 4 to 6 were prepared as in Example 1 except that the thickness of PVdF-HFP and the amount of the electrolyte solution poured were changed as shown in Table 1. MA and MO were determined as in Example 1. The ratio MO/MA is shown in Table 1.

Examples 8 to 12 and Comparative Examples 7 and 8

Nonaqueous electrolyte secondary cells of Examples 8 to 12 and Comparative Examples 7 and 8 were prepared as in Example 1 except that polyvinylidene fluoride (PVdF) was used as the polymeric support and the thickness of the PVdF and the amount of the electrolyte solution poured were changed as in Table 1. MA and MO were determined as in Example 1. The ratio MO/MA is shown in Table 1.

Example 13

A nonaqueous electrolyte secondary cell of Example 13 was prepared as in Example 1 except that the cell body after sealing was interposed between the iron plates for 3 minutes without heating at 70° C. MA and MO were determined as in Example 1. The ratio MO/MA is shown in Table 1.

A nonaqueous electrolyte secondary cell of Example 14 was prepared as in Example 1 except that polyvinylidene fluoride (PVdF) was used as the polymeric support. MA and MO were determined as in Example 1. The ratio MO/MA is shown in Table 1.

Comparative Example 9

A nonaqueous electrolyte secondary cell of Comparative Example 9 was prepared as in Example 1 except that the amount of the nonaqueous electrolyte solution poured was changed to 1.5 mL. The nonaqueous electrolyte secondary cell was unsealed, and 0.10 mL of the same nonaqueous electrolyte solution was added so that the total amount of the solution poured was 1.6 mL. The cell was sealed again to make a nonaqueous electrolyte secondary cell of Comparative Example 9. MA and MO were determined as in Example 1. The ratio MO/MA is shown in Table 1.

Table 1 shows the specifics of each example.

Evaluation of Performance

Initial Discharge Capacity

The nonaqueous electrolyte secondary cell of each example was subjected to charging at a constant current and voltage of 200 mA at 23° C. up to 4.2 V for 7 hours and then to discharging at a constant current of 200 mA down to a final voltage of 2.5 V to measure the initial discharge capacity. The observed results are also shown in Table 1.

Percentage of Retaining Discharge Capacity

The nonaqueous electrolyte secondary cell of each example after the measurement of the initial discharge capacity was subjected 300 cycles of charging at a constant current and voltage of 500 mA at 23° C. for 2 hours up to 4.2 V and discharging at a constant current of 500 mA down to a final voltage of 2.5 V. The percentage of retaining the discharge capacity of the 300th cycle while assuming the discharge capacity of the first cycle after 500 mA discharge to be 100% was determined. The results are shown in Table 1.

Amount of Swelling

The nonaqueous electrolyte secondary cell of each example was stored at 90° C. for 6 hours and the amount of swelling was measured. The results are shown in Table 1.

Table 1 shows that the initial discharge capacity and the percentage of retaining the discharge capacity can be maintained high with the polymeric support composed of PVdF-HFP or PVdF. The results also show that the amount of swelling after storage at 90° C. for 6 hours can be decreased to 1 mm or less by adjusting the ratio MO/MA to be 0.04 or less and that the amount of swelling after 6 hours of storage at 90° C. is large at MO/MA less than 0.04. In particular, Comparative Example 5 shows that at a large ratio MO/MA, the amount of swelling is large even when the total amount of the electrolyte solution is 1.6 mL. Thus, it was confirmed that the amount of swelling was dependent on MO/MA and that the swelling during storage at high temperature can be suppressed or prevented by making the MO/MA less than 0.04. The value of MO/MA tends to increase with the amount of electrolyte solution charged and tends to decrease as the

TABLE 1

| | Composition of polymeric support | Thickness (μm) of polymeric support on one face | Amount of electrolyte solution poured (mL) | MO/MA (—) | Initial discharge capacity (mAh) | Percentage of retaining discharge capacity | Amount of swelling (mm) |
|---|---|---|---|---|---|---|---|
| Example 1 | PVdF-HFP | 5 | 1.6 | 0.030 | 984 | 88 | 0.52 |
| Example 2 | PVdF-HFP | 5 | 1.7 | 0.038 | 982 | 90 | 0.72 |
| Example 3 | PVdF-HFP | 5 | 1.72 | 0.040 | 982 | 90 | 0.76 |
| Example 4 | PVdF-HFP | 2 | 1.6 | 0.036 | 984 | 86 | 0.70 |
| Example 5 | PVdF-HFP | 8 | 1.6 | 0.026 | 981 | 89 | 0.40 |
| Example 6 | PVdF-HFP | 8 | 1.7 | 0.033 | 982 | 91 | 0.62 |
| Example 7 | PVdF-HFP | 8 | 1.75 | 0.038 | 982 | 92 | 0.74 |
| Example 8 | PVdF | 5 | 1.6 | 0.031 | 980 | 85 | 0.60 |
| Example 9 | PVdF | 5 | 1.7 | 0.040 | 980 | 88 | 0.83 |
| Example 10 | PVdF | 2 | 1.6 | 0.038 | 983 | 83 | 0.72 |
| Example 11 | PVdF | 8 | 1.6 | 0.030 | 980 | 86 | 0.46 |
| Example 12 | PVdF | 8 | 1.7 | 0.037 | 981 | 86 | 0.70 |
| Example 13 | PVdF-HFP | 5 (unbonded) | 1.6 | 0.032 | 983 | 76 | 0.62 |
| Example 14 | PVdF | 5 (unbonded) | 1.6 | 0.034 | 982 | 78 | 0.64 |
| Co. Example 1 | — | — | 1.6 | 0.035 | 983 | 64 | 0.77 |
| Co. Example 2 | — | — | 1.7 | 0.042 | 984 | 72 | 1.14 |
| Co. Example 3 | — | — | 1.8 | 0.054 | 984 | 82 | 1.61 |
| Co. Example 4 | PVdF-HFP | 5 | 1.75 | 0.044 | 982 | 90 | 1.13 |
| Co. Example 5 | PVdF-HFP | 2 | 1.7 | 0.045 | 984 | 88 | 1.19 |
| Co. Example 6 | PVdF-HFP | 8 | 1.8 | 0.042 | 983 | 92 | 1.10 |
| Co. Example 7 | PVdF | 2 | 1.7 | 0.048 | 981 | 85 | 1.28 |
| Co. Example 8 | PVdF | 8 | 1.75 | 0.041 | 982 | 87 | 1.08 |
| Co. Example 9 | PVdF-HFP | 5 | 1.5 + 0.1 | 0.051 | 981 | 87 | 1.34 |

Co. Example: Comparative Example amount of the polymeric support increases. The swellability of the polymeric support with the electrolyte solution is higher with PVdF-HFP than PVdF. The value of MO/MA tends to decrease when the polymeric support is composed of a material having a higher swellability.

When no polymeric support layer is provided, the value of MO/MA tends to increase as compared with the cases where the polymeric support layer is formed. However, when MO/MA is less than 0.04, the percentage of retaining the discharge capacity is decreased although the amount of swelling after 6 hours of storage at 90° C. is 1 mm or less.

This confirms that it is necessary to provide a polymeric support layer in order to achieve both suppression of amount of swelling during storage at high temperature and excellent cycle characteristics. Comparison between Examples 1 to 12 with Examples 13 and 14 shows that further desirable cycle characteristics can be achieved by heating the polymeric support installed such that the polymeric support is heat-bonded and adhered to the separator and the electrodes.

Examples 15 to 21

Nonaqueous electrolyte secondary cells of Examples 15 to 21 were prepared as in Example 1 except that instead of the ethylene carbonate 4/diethyl carbonate 6 (in terms of mass) mixture solvent, solvents prepared by adding one or both of 4-fluoro-1,3-dioxolan-2-one (FEC) and 4-chloro-1,3-dioxolan-2-one (CEC) to the ethylene carbonate 4/diethyl carbonate 6 (in terms of mass) mixture solvent to yield concentrations shown in Table 2. The details of each example are shown in Table 2.

nated cell element in which a plurality of positive electrodes and a plurality of negative electrodes are stacked although the description above has been directed to the cases where the cell includes the rolled cell element 120 including the laminated and wound positive electrode 121 and negative electrode 122.

Moreover, although the film-shaped packaging members are used in the embodiment above, the present application is also applicable to other cells that face the same technical problem of how to suppress swelling during storage at high temperature, such as cells in square can packages.

Furthermore, the present application is applicable to not only secondary cells but also to primary cells.

Although the first embodiment has been described as relating to a cell using lithium as the electrode reaction substance, the technical idea is also applicable to cases where alkali metals such as sodium (Na), potassium (K), and the like, alkaline earth metals such as magnesium (Mg), calcium (Ca), and the like, and other light metals such as aluminum are used.

Examples

The second embodiment will now be described in further detail by using Examples and Comparative Examples. The second embodiment is by no means limited by these examples.

Example 1-1

Per mole of cobalt carbonate ($COCO_3$), 0.5 mol of lithium carbonate ($LiCO_3$) was mixed, and the resulting mixture was

TABLE 2

| | Composition of polymeric support | Thickness (μm) of polymeric support on one face | Amount of electrolyte solution poured (mL) | MO/MA (—) | FEC (%) | CEC (%) | Initial discharge capacity (mAh) | Percentage of retaining discharge capacity | Amount of swelling (mm) |
|---|---|---|---|---|---|---|---|---|---|
| Example 1 | PVdF-HFP | 5 | 1.6 | 0.030 | 0 | 0 | 984 | 88 | 0.52 |
| Example 15 | PVdF-HFP | 5 | 1.6 | 0.030 | 2 | 0 | 972 | 92 | 0.73 |
| Example 16 | PVdF-HFP | 5 | 1.6 | 0.031 | 1 | 0 | 974 | 92 | 0.64 |
| Example 17 | PVdF-HFP | 5 | 1.6 | 0.030 | 0.5 | 0 | 976 | 91 | 0.58 |
| Example 18 | PVdF-HFP | 5 | 1.6 | 0.031 | 0 | 2 | 973 | 90 | 0.75 |
| Example 19 | PVdF-HFP | 5 | 1.6 | 0.030 | 0 | 1 | 975 | 91 | 0.66 |
| Example 20 | PVdF-HFP | 5 | 1.6 | 0.029 | 0 | 0.5 | 976 | 90 | 0.59 |
| Example 21 | PVdF-HFP | 5 | 1.6 | 0.030 | 0.5 | 0.5 | 976 | 92 | 0.66 |

Evaluation of Performance

The nonaqueous electrolyte secondary cell of each example was evaluated in terms of initial discharge capacity, the percentage of retaining the discharge capacity, and the amount of swelling as previously described. The results are shown in Table 2 along with the results of Example 1.

Table 2 shows that the percentage of retaining the discharge capacity is high and the cycle characteristics tend to be improved in Examples 15 to 21 containing one or both of 4-fluoro-1,3-dioxolan-2-one (FEC) and 4-chloro-1,3-dioxolan-2-one (CEC) in the electrolyte solution. Thus, it is preferable that the electrolyte solution contain one or both of 4-fluoro-1,3-dioxolan-2-one (FEC) and 4-chloro-1,3-dioxolan-2-one (CEC).

Although the first embodiment of the application has been described above by describing examples, the application is not limited to this. Various modifications and alterations are possible without departing from the scope.

For example, the present application is applicable to a plate-shaped cell element including a positive electrode and a pairing negative electrode stacked on each other and a lamifired at 900° C. for 5 hours to obtain a lithium cobalt compound oxide ($LiCoO_2$) as the positive electrode active material.

Next, 85 parts by mass of the lithium cobalt compound oxide obtained, 5 parts by mass of graphite serving as a conductive agent, and 10 parts by mass of polyvinylidene fluoride serving as a binder were homogeneously mixed to prepare a positive electrode mixture, and the positive electrode mixture was dispersed in a dispersion medium, N-methyl-2-pyrrolidone to obtain a positive electrode mixture slurry. The positive electrode mixture slurry was evenly applied on both faces of the positive electrode collector which is a 20 μm-thick aluminum foil, dried, and press-formed with a roll press to form a positive electrode active material layer 221B to thereby form a positive electrode 221. A positive electrode terminal 211 was then attached on the positive electrode 221.

A pulverized graphite powder was prepared as a negative electrode active material, and 90 parts by mass of the graphite powder and 10 parts by mass of polyvinylidene fluoride serving as a binder were homogenously mixed to prepare a negative electrode mixture, and the negative electrode mixture was dispersed in a dispersion medium N-methyl-2-pyrrolidone to obtain a negative electrode mixture slurry.

The negative electrode mixture slurry was evenly applied on both faces of the negative electrode collector 222A which was a 15 μm-thick copper foil, dried, and press-formed with a roll press to prepare a negative electrode active material layer 222B and to thereby prepare a negative electrode 222. The ratio of the capacity of the positive electrode to the capacity of the negative electrode was set to 1.5. A negative electrode terminal 212 was then attached on the negative electrode 222.

As the polymeric compound used for the polymeric support layer 223, polyvinylidene fluoride was used. A solution of this polymer in an amount of 15 parts by mass dissolved in N-methyl-2-pyrrolidone was applied on both faces of the separator 224 composed of a 20 μm-thick microporous polyethylene film with a coating machine.

The polyethylene film with the polymer solution coatings was immersed in deionized water and dried so that a polymeric support layer 224 having a thickness of 5 μm was formed on each face of the separator 223 made of a polyethylene film.

The positive electrode 221 and the negative electrode 222 prepared as above were bonded to each other with the separator therebetween and wound in the longitudinal direction. A protective tape 225 was applied on the outermost periphery to obtain a rolled electrode body to obtain the rolled cell element 220.

The rolled cell element 220 was interposed between the packaging members 230A and 230B and the three sides of the packaging members were heat-sealed. The packaging members 230A and 230B were each a moisture-resistant aluminum laminated film constituted from a 25 μm-thick nylon film, a 40 μm-thick aluminum foil, and a 30 μm-thick polypropylene film stacked in that order from the outermost layer side.

Subsequently, the nonaqueous electrolyte solution was poured into the exterior package 230 accommodating the rolled cell element 220 such that the weight of the electrolyte solution in the cell is 1.85 g. The remaining open side was heat-bonded under a reduced pressure to provide hermetic seal.

Here, 1.2 mol/L of lithium hexafluorophosphate was dissolved in a solvent containing cyclic carbonates, i.e., ethylene carbonate (EC) and propylene carbonate (PC), and chain carbonates, i.e., diethyl carbonate (DEC) and ethyl methyl carbonate (EMC) at a mass ratio of EC:PC:DEC:EMC=20:10:40:30, and the resulting solution was used as the electrolyte solution. The boiling points of diethyl carbonate and ethyl methyl carbonate are 127° C. and 108° C., respectively.

The resulting sealed body was interposed between steel plates and heated at 70° C. for 4 minutes to bond the positive electrode 221 and the negative electrode 222 to the separator 224 via the polymeric support layers 223.

A nonaqueous electrolyte secondary cell shown in FIGS. 4 and 5 having a cell size of 4×35×50 mm(7 cm³) was thereby obtained.

Example 1-2

A nonaqueous electrolyte secondary cell of Example 1-2 was obtained by the operation of Example 1-1 except that the nonaqueous solvent of the electrolyte solution was changed to EC:DEC=20:80.

Example 1-3

A nonaqueous electrolyte secondary cell of Example 1-3 was obtained by the operation of Example 1-1 except that the nonaqueous solvent of the electrolyte solution was changed to EC:DEC=30:70.

Example 1-4

A nonaqueous electrolyte secondary cell of Example 1-4 was obtained by the operation of Example 1-1 except that the nonaqueous solvent of the electrolyte solution was changed to EC:PC:DEC:EMC=30:10:40:20.

Example 1-5

A nonaqueous electrolyte secondary cell of Example 1-5 was obtained by the operation of Example 1-1 except that the nonaqueous solvent of the electrolyte solution was changed to EC:DEC=40:60.

Example 1-6

A nonaqueous electrolyte secondary cell of Example 1-6 was obtained by the operation of Example 1-1 except that the nonaqueous solvent of the electrolyte solution was changed to EC:PC:DEC:EMC=40:10:30:20.

Example 1-7

A nonaqueous electrolyte secondary cell of Example 1-7 was obtained by the operation of Example 1-1 except that the nonaqueous solvent of the electrolyte solution was changed to EC:DEC=50:50.

Comparative Example 1-1

A nonaqueous electrolyte secondary cell of Comparative Example 1-1 was obtained by the operation of Example 1-1 except that the nonaqueous solvent of the electrolyte solution was changed to EC:DEC:EMC=15:60:25.

Comparative Example 1-2

A nonaqueous electrolyte secondary cell of Comparative Example 1-2 was obtained by the operation of Example 1-1 except that the nonaqueous solvent of the electrolyte solution was changed to EC:PC:DEC:EMC=5:5:60:30.

Comparative Example 1-3

A nonaqueous electrolyte secondary cell of Comparative Example 1-3 was obtained by the operation of Example 1-1 except that the nonaqueous solvent of the electrolyte solution was changed to EC:PC:DEC:EMC=50:5:30:15.

Comparative Example 1-4

A nonaqueous electrolyte secondary cell of Comparative Example 1-4 was obtained by the operation of Example 1-1 except that the nonaqueous solvent of the electrolyte solution was changed to EC:PC:DEC=30:25:45.

Evaluation of Discharge Capacity

Each of the secondary cells of Examples 1-1 to 1-7 and Comparative Examples 1-1 to 1-4 was subjected to charging at a constant current and voltage of 200 mA at 23° C. up to 4.2

V for seven hours and then to discharging at a constant current of 200 mA down to a final voltage to 2.5 V to measure the initial discharge capacity.

Each cell was then subjected to 300 cycles of charging at a constant current and voltage of 500 mA at 23° C. for 2 hours up to 4.2 V and discharging at a constant current of 500 mA down to a final voltage of 2.5 V. The percentage of retaining the discharge capacity of the 300th cycle while assuming the discharge capacity of the first cycle after 500 mA discharge to be 100% was determined. The initial discharge capacity and the percentage of retaining the capacity of the 300th cycle are shown in Table 3.

Measurement of Weight of Electrolyte

The weight of the electrolyte solution in the cell of the secondary cells of Examples and Comparative Examples above was measured.

After the initial discharge capacity was determined, the electrode body was taken out and the electrode body was disassembled into the positive electrode, the negative electrode, and the separator. The positive electrode, the negative electrode, the separator, and the packaging members were immersed in a dimethyl carbonate solution for 2 days, followed by filtering, and vacuum-dried for 3 days. The weight of electrolyte was determined from the difference between the initial weight and the weight after the vacuum drying. The results are shown in Table 3.

TABLE 3

|  | EC | PC | DEC | EMC | Amount of electrolyte per cm$^3$ (g) | Initial discharge capacity (mAh) | Percentage of retaining capacity |
|---|---|---|---|---|---|---|---|
| Example 1-1 | 20 | 10 | 40 | 30 | 0.26 | 981 | 87 |
| Example 1-2 | 20 | 0 | 80 | 0 | 0.26 | 985 | 85 |
| Example 1-3 | 30 | 0 | 70 | 0 | 0.26 | 988 | 85 |
| Example 1-4 | 30 | 10 | 40 | 20 | 0.26 | 978 | 86 |
| Example 1-5 | 40 | 0 | 60 | 0 | 0.26 | 984 | 83 |
| Example 1-6 | 40 | 10 | 30 | 20 | 0.26 | 975 | 84 |
| Example 1-7 | 50 | 0 | 50 | 0 | 0.26 | 976 | 82 |
| Co. Example 1-1 | 15 | 0 | 60 | 25 | 0.26 | 973 | 64 |
| Co. Example 1-2 | 5 | 5 | 60 | 30 | 0.26 | 971 | 66 |
| Co. Example 1-3 | 50 | 5 | 30 | 15 | 0.26 | 968 | 61 |
| Co. Example 1-4 | 30 | 25 | 45 | 0 | 0.26 | 959 | 59 |

Co. Example: Comparative Example

Table 3 shows that the secondary cells of Examples 1-1 to 1-7 showed excellent cycle characteristics whereas cells of Comparative Examples 1-1 to 1-4 showed poor cycle characteristics. Such degradation in cycle properties is presumably attributable to the fact that the solvent composition of cells of Comparative Examples 1-1 to 1-4 was outside the ranges of 20% to 50% of cyclic carbonates and 50% to 80% of the low-viscosity nonaqueous solvent and that the adhesion between the electrodes and the separators was insufficient.

In other words, Table 3 demonstrates that when the polymeric support layer 223 retaining the nonaqueous electrolyte solution is interposed between the positive electrode 221 and the separator 224 and between the negative electrode 222 and the separator 224 and when the nonaqueous electrolyte solution contains a solvent containing 20% to 50% of the cyclic carbonates and 50% to 80% of the low-viscosity nonaqueous solvent, excellent cycle characteristics can be achieved.

Example 2-1

A nonaqueous electrolyte secondary cell of Example 2-1 was prepared as in Example 1-1 except that the polymeric support layer 223 was formed on only one face of the separator 224, and the rolled cell element 220 was made such that the face of the separator 224 with the polymeric support layer 223 opposed the negative electrode 222.

Example 2-2

A nonaqueous electrolyte secondary cell of Example 2-2 was prepared as in Example 1-1 except that the polymeric support layer 223 was formed on only one face of the separator 224, and the rolled cell element 220 was made such that the face of the separator 224 with the polymeric support layer 223 opposed the positive electrode 221.

Example 2-3

A nonaqueous electrolyte secondary cell of Example 2-3 was obtained as in Example 1-1 except that the nonaqueous electrolyte solution was poured such that the weight of the electrolyte solution in the cell was 1.01 g.

Example 2-4

A nonaqueous electrolyte secondary cell of Example 2-4 was obtained as in Example 1-1 except that the nonaqueous electrolyte solution was poured such that the weight of the electrolyte solution in the cell was 2.45 g.

Comparative Example 2-1

A nonaqueous electrolyte secondary cell of Comparative Example 2-1 was obtained as in Example 1-1 except that the nonaqueous electrolyte solution was poured such that the weight of the electrolyte solution in the cell was 0.93 g.

Comparative Example 2-2

A nonaqueous electrolyte secondary cell of Comparative Example 2-2 was obtained as in Example 1-1 except that the nonaqueous electrolyte solution was poured such that the weight of the electrolyte solution in the cell was 2.57 g.

Comparative Example 2-3

A nonaqueous electrolyte secondary cell of Comparative Example 2-3 was obtained as in Example 1-1 except that the nonaqueous electrolyte solution was poured such that the weight of the electrolyte solution in the cell was 1.17 g and that the volume of the cell was 9.0 cm$^3$.

Comparative Example 2-4

A nonaqueous electrolyte secondary cell of Comparative Example 2-4 was obtained as in Example 1-1 except that the nonaqueous electrolyte solution was poured such that the weight of the electrolyte solution in the cell was 2.34 g and that the volume of the cell was 6.0 cm$^3$.

Evaluation of Discharge Capacity and Measurement of Weight of Electrolyte Solution The initial discharge capacity and the capacity retention percentage of the 300th cycle of the cells of Examples 2-1 to 2-4 and Comparative Examples 2-1 to 2-4 were measured, and the weight of the electrolyte solution was measured. The results are shown in Table 4 along with the results of Example 1-1.

Liquid Leakage Test

Each of the cells of Examples and Comparative Examples above was subjected to liquid leakage test.

Ten samples of the secondary cells of each example were made, and a hole having a diameter of 0.5 mm was formed in each packaging member 230A. The sample was pressed at a pressure of 5 MPa, and the number of cells from which the electrolyte solution leaked was determined. The results are also shown in Table 4.

TABLE 4

|  | Cell volume (cm$^3$) | Amount of electrolyte solution (g) | Amount of electrolyte solution per cm$^3$ (g) | Initial discharge capacity (mAh) | Percentage of capacity retention | Number of samples with leakage |
|---|---|---|---|---|---|---|
| Example 1-1 | 7.0 | 1.85 | 0.26 | 981 | 87 | 0/10 |
| Example 2-1 | 7.0 | 1.85 | 0.26 | 978 | 87 | 0/10 |
| Example 2-2 | 7.0 | 1.85 | 0.26 | 976 | 86 | 0/10 |
| Example 2-3 | 7.0 | 1.01 | 0.14 | 976 | 85 | 0/10 |
| Example 2-4 | 7.0 | 2.45 | 0.35 | 984 | 89 | 0/10 |
| Co. Example 2-1 | 7.0 | 0.93 | 0.13 | 981 | 71 | 0/10 |
| Co. Example 2-2 | 7.0 | 2.57 | 0.37 | 980 | 89 | 6/10 |
| Co. Example 2-3 | 9.0 | 1.17 | 0.13 | 1256 | 68 | 0/10 |
| Co. Example 2-4 | 6.0 | 2.34 | 0.39 | 838 | 88 | 7/10 |

Co. Example: Comparative Example

Table 4 shows that the secondary cells of Examples 1-1 and 2-1 to 2-4 have excellent cycle characteristics and do not undergo liquid leakage while the secondary cells of Comparative Examples 2-1 and 2-3 have poor cycle characteristics and the secondary cells of Comparative Examples 2-2 and 2-4 have a large number of samples with leakage.

This is presumably because deficiency of the electrolyte solution occurred in the cells of Comparative Examples 2-1 and 2-3, thereby resulting in degraded cycle characteristics and because excess electrolyte solution was generated in the cells of Comparative Examples 2-2 and 2-4, thereby resulting in an increased number of samples with leakage.

In other words, these results demonstrate that excellent cycle characteristics and resistant to liquid leakage can be achieved by providing a polymeric support layer 223 retaining the nonaqueous electrolyte solution between the positive electrode 221 and/or negative electrode 222 and the separator 224 and by adjusting the amount of nonaqueous electrolyte solution in the cell to 0.14 g or more and 0.35 g or less per cubic centimeter of the cell volume.

Example 3-1

A nonaqueous electrolyte secondary cell of Example 3-1 was prepared as in Example 1-1 except that a copolymer obtained by copolymerizing 91 parts by mass of vinylidene fluoride, 4 parts by mass of hexafluoropropylene, and 5 parts by mass of chlorotrifluoroethylene was used as the polymeric compound for forming the polymeric support layer 223.

Example 3-2

A nonaqueous electrolyte secondary cell of Example 3-2 was prepared as in Example 1-1 except that a polymethyl methacrylate was used as the polymeric compound for forming the polymeric support layer 223.

Example 3-3

A nonaqueous electrolyte secondary cell of Example 3-3 was prepared as in Example 1-1 except that polyvinyl formal was used as the polymeric compound for forming the polymeric support layer 223.

Example 3-4

A nonaqueous electrolyte secondary cell of Example 3-4 was prepared as in Example 1-1 except that styrene butadiene rubber was used as the polymeric compound for forming the polymeric support layer 223.

Evaluation of Discharge Capacity

As in Example 1-1, the initial discharge capacity and the percentage of retaining the capacity of 300th cycle of each of the secondary cells of Example 3-1 to 3-4 were measured. The results are shown in Table 5 along with the results of Example 1-1 that used polyvinylidene fluoride.

TABLE 5

|  | Polymeric compound | Initial discharge capacity (mAh) | Percentage of retaining the capacity |
|---|---|---|---|
| Example 1-1 | Polyvinylidene fluoride | 981 | 87 |
| Example 3-1 | Vinylidene fluoride copolymer | 984 | 87 |
| Example 3-2 | Polymethyl methacrylate | 979 | 85 |
| Example 3-3 | Polyvinyl formal | 981 | 84 |
| Example 3-4 | Styrene butadiene rubber | 976 | 83 |

Table 5 shows that the secondary cells of Examples 1-1 and 3-1 to 3-4 have excellent cycle characteristics.

In other words, excellent cycle characteristics can be achieved by using a polymer containing a polyvinylidene fluoride as a component, polymethacrylate, polyvinyl acetal, or styrene butadiene rubber as the polymeric compound.

Example 4-1 to 4-7

Secondary cells of Examples 4-1 to 4-7 were prepared as in Example 1-1 except that the nonaqueous solvent ratio in the electrolyte solution was changed to EC:DEC=30:70 and that 4-fluoro-1,3-dioxolan-2-one (FEC) and 4-chloro-1,3-dioxolan-2-one (CEC) were added as shown in Table 6.

The initial discharge capacity and the percentage of retaining the capacity of the secondary cells of Examples 4-1 to 4-7 were measured as in Example 1-1. The results are shown in Table 6 along with the results of Example 1-3.

TABLE 6

|  | FEC (%) | CEC (%) | Initial discharge capacity (mAh) | Percentage of retaining the capacity |
|---|---|---|---|---|
| Example 1-3 | 0 | 0 | 988 | 85 |
| Example 4-1 | 2 | 0 | 975 | 89 |
| Example 4-2 | 1 | 0 | 977 | 90 |
| Example 4-3 | 0.5 | 0 | 979 | 89 |
| Example 4-4 | 0 | 2 | 976 | 88 |
| Example 4-5 | 0 | 1 | 978 | 89 |
| Example 4-6 | 0 | 0.5 | 979 | 88 |
| Example 4-7 | 0.5 | 0.5 | 977 | 89 |

Table 6 shows that the cycle characteristics of Examples 4-1 to 4-7 containing at least one of 4-fluoro-1,3-dioxolan-2-one (FEC) and 4-chloro-1,3-dioxolan-2-one (CEC) were as good as Example 1-3, their percentage of retaining the capacity was superior to that of Example 1-3.

In other words, the results demonstrate that adding one or both of 4-fluoro-1,3-dioxolan-2-one (FEC) and 4-chloro-1,3-dioxolan-2-one (CEC) is more preferable from the standpoint of improving the cycle characteristics.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolyte secondary cell comprising:
an electrode body including a positive electrode, a negative electrode, and a separator, the positive electrode and the negative electrode being arranged to oppose each other with the separator therebetween, and being rolled or stacked;
a nonaqueous electrolyte solution; and
an exterior package for accommodating the electrode body and the nonaqueous electrolyte solution,
wherein a polymeric support is provided between the separator and at least one of the positive electrode and the negative electrode, and
the ratio (MO/MA) of the amount (MO) of the nonaqueous electrolyte solution present between the electrode body and the exterior package to the amount (MA) of the nonaqueous electrolyte solution present in the exterior package is 0.04 or less.

2. The nonaqueous electrolyte secondary cell according to claim 1, wherein the polymeric support is adhered or bonded to the separator and at least to one of the positive electrode and the negative electrode.

3. The nonaqueous electrolyte secondary cell according to claim 1, wherein the polymeric support contains polyvinylidene fluoride-hexafluoropropylene.

4. The nonaqueous electrolyte secondary cell according to claim 1, wherein the nonaqueous electrolyte solution contains a cyclic carbonate and a chain carbonate.

5. The nonaqueous electrolyte secondary cell according to claim 1, wherein the nonaqueous electrolyte solution contains a halogen-containing cyclic carbonic ester derivative.

6. The nonaqueous electrolyte secondary cell according to claim 5, wherein the cyclic carbonic ester derivative is at least one of 4-fluoro-1,3-dioxolan-2-one and 4-chloro-1,3-dioxolan-2-one.

7. The nonaqueous electrolyte secondary cell according to claim 1, wherein the exterior package is comprised of a laminate film.

8. A nonaqueous electrolyte secondary cell comprising:
a positive electrode;
a negative electrode;
a nonaqueous electrolyte solution;
a separator disposed between the positive electrode and the negative electrode; and
an exterior package comprised of a laminate film, for packaging the positive electrode, the negative electrode, the nonaqueous electrolyte solution, and the separator,
wherein a polymeric support is disposed between the separator and at least one of the positive electrode and the negative electrode, the polymeric support adhering to the separator and at least one of the positive electrode and the negative electrode,
the nonaqueous electrolyte solution contains a nonaqueous solvent containing 20 percent by mass or more and 50 percent by mass or less of a cyclic carbonate and 50 percent by mass or more and 80 percent by mass or less of a low-viscosity nonaqueous solvent, and
the amount of the nonaqueous electrolyte solution present in the nonaqueous electrolyte secondary cell is 0.14 g or more and 0.35 g or less per cubic centimeter of the volume of the nonaqueous electrolyte secondary cell.

9. The nonaqueous electrolyte secondary cell according to claim 8, wherein the low-viscosity nonaqueous solvent is a chain carbonate having a boiling point of 130° C. or less.

10. The nonaqueous electrolyte secondary cell according to claim 8, wherein the polymeric support contains a polymer containing a polyvinylidene fluoride as a component.

11. The nonaqueous electrolyte secondary cell according to claim 8, wherein the polymeric support is made of polymethacrylic acid.

12. The nonaqueous electrolyte secondary cell according to claim 8, wherein the polymeric support includes polyvinyl acetal and/or a derivative of polyvinyl acetal.

13. The nonaqueous electrolyte secondary cell according to claim 8, wherein the polymeric support is made of styrene butadiene rubber.

14. The nonaqueous electrolyte secondary cell according to claim 8, wherein the laminate film is made of aluminum and a resin.

15. The nonaqueous electrolyte secondary cell according to claim 8, wherein the nonaqueous electrolyte solution contains a halogen-containing cyclic carbonic ester derivative.

16. The nonaqueous electrolyte secondary cell according to claim 15, wherein the halogen-containing cyclic carbonic ester derivative is at least one of 4-fluoro-1,3-dioxolan-2-one and 4-chloro-1,3-dioxolan-2-one.

* * * * *